US012164258B2

(12) United States Patent
Hashimoto et al.

(10) Patent No.: US 12,164,258 B2
(45) Date of Patent: Dec. 10, 2024

(54) IMAGE FORMING APPARATUS

(71) Applicant: CANON KABUSHIKI KAISHA, Tokyo (JP)

(72) Inventors: Yoshinori Hashimoto, Kanagawa (JP); Shogo Miyakawa, Kanagawa (JP); Akira Yoshimura, Shizuoka (JP); Hiromi Fujinaka, Tokyo (JP); Isao Matsuoka, Kanagawa (JP); Shigeru Hoashi, Shizuoka (JP); Tomoya Kuruma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/467,612

(22) Filed: Sep. 14, 2023

(65) Prior Publication Data

US 2024/0004338 A1 Jan. 4, 2024

Related U.S. Application Data

(63) Continuation of application No. 17/532,445, filed on Nov. 22, 2021, now Pat. No. 11,809,122, which is a (Continued)

(30) Foreign Application Priority Data

Dec. 25, 2019 (JP) ................................ 2019-234671

(51) Int. Cl.
*G03G 21/16* (2006.01)

(52) U.S. Cl.
CPC ................................ *G03G 21/1619* (2013.01)

(58) Field of Classification Search
CPC ............. G03G 21/1619; G03G 21/168; G03G 21/1695; G03G 21/16; G03G 2221/16; G03G 2221/1678; G03G 2221/1642
See application file for complete search history.

(56) References Cited

U.S. PATENT DOCUMENTS

| | | | | |
|---|---|---|---|---|
| 5,539,447 | A * | 7/1996 | Akuta | G03G 15/04 347/245 |
| 2009/0274484 | A1 * | 11/2009 | Takemoto | G03G 21/16 399/107 |

(Continued)

FOREIGN PATENT DOCUMENTS

| | | | |
|---|---|---|---|
| JP | S60122929 | U | 8/1985 |
| JP | H04269767 | A | 9/1992 |

(Continued)

*Primary Examiner* — Sandra Brase
(74) *Attorney, Agent, or Firm* — Canon U.S.A., Inc. IP Division

(57) ABSTRACT

According to an aspect of the present disclosure, an image forming apparatus includes a feeding module, an image forming module, and a fixing module. The feeding module feeds a recording material. The image forming module includes a photosensitive drum and forms a developer image on the recording material fed to the image forming module by the feeding module. The fixing module fixes the developer image formed by the image forming module to the recording material. The image forming module includes a scanner frame that supports an exposure unit configured to expose the photosensitive drum. The feeding module is installed on the scanner frame.

14 Claims, 31 Drawing Sheets

Related U.S. Application Data continuation of application No. 17/119,968, filed on Dec. 11, 2020, now Pat. No. 11,204,580.

(56) References Cited

U.S. PATENT DOCUMENTS

| | | | | |
|---|---|---|---|---|
| 2010/0067952 | A1* | 3/2010 | Fujita | G03G 15/6564 399/168 |
| 2010/0244358 | A1* | 9/2010 | Okuchi | G03G 15/6514 271/9.01 |
| 2014/0016980 | A1* | 1/2014 | Minoshima | G03G 21/1695 271/10.01 |
| 2014/0199095 | A1* | 7/2014 | Yoon | G03G 21/185 399/111 |
| 2020/0393788 | A1* | 12/2020 | Okamoto | G03G 21/1695 |

FOREIGN PATENT DOCUMENTS

| | | | |
|---|---|---|---|
| JP | H04304477 | A | 10/1992 |
| JP | 2001347724 | A | 12/2001 |
| JP | 2003241618 | A | 8/2003 |
| JP | 2008310232 | A | 12/2008 |
| JP | 2014106485 | A | 6/2014 |
| JP | 2014109745 | A | 6/2014 |
| JP | 2014174254 | A | 9/2014 |
| JP | 2016112698 | A | 6/2016 |

* cited by examiner

IMAGE FORMING APPARATUS

CROSS REFERENCE TO RELATED APPLICATIONS

This application is a continuation of U.S. patent application Ser. No. 17/532,445, filed on Nov. 22, 2021, which is a continuation of U.S. patent application Ser. No. 17/119,968, filed on Dec. 11, 2020 and issued as U.S. Pat. No. 11,204,580 on Dec. 21, 2021, which claims priority from Japanese Patent Application No. 2019-234671, filed Dec. 25, 2019, each of which are hereby incorporated by reference herein in their entirety.

BACKGROUND OF THE DISCLOSURE

Field of the Disclosure

The present disclosure relates to an image forming apparatus such as a printer or a copying machine employing an image forming process.

Description of the Related Art

As an image forming apparatus such as a printer or a copying machine, there has been known an image forming apparatus capable of achieving a flexible product configuration by modularizing a plurality of relevant components and combining modules together as appropriate in accordance with specifications for a product (for example, Japanese Patent Application Laid-Open No. H06-035248). In such an image forming apparatus, a plurality of functional components are prepared as modules in accordance with specifications for a product such as printing speed, and the functional components are freely mountable to an apparatus frame of the image forming apparatus with the same interface.

However, in the configuration in which the modules (functional components) are mounted to the apparatus frame, the components are mounted to each other through intermediation of the apparatus frame, and hence positioning accuracy between the components may be degraded. For example, when there are provided two modules each including a roller, an increase in the number of components interposed between the two rollers may cause misalignment between the rollers, which in turn causes the two rollers to lose alignment. As a result, conveying performance for a recording material and printing accuracy may be degraded.

Further, in the related-art apparatus frame configuration, the apparatus frame has a size equivalent to a size of a main body of the image forming apparatus, thereby securing rigidity of the main body of the image forming apparatus. Accordingly, in order to secure the rigidity of the main body of the image forming apparatus, it is required to increase strength of the entire apparatus frame. That is, in order to prevent degradation in printing accuracy due to deformation of an image forming portion caused by distortion of the main body of the image forming apparatus at the time of installation of the image forming apparatus, it is required to secure rigidity of the entire apparatus frame with cost.

SUMMARY OF THE DISCLOSURE

As described above, for the image forming apparatus formed by combining the modules, it has been desired to secure the rigidity of the main body at low cost while securing higher positioning accuracy between the modules. The present disclosure discusses an image forming apparatus that works towards preventing occurrence of misalignment in an image forming module, and securing rigidity.

An image forming apparatus includes a feeding module configured to feed a recording material, an image forming module having a photosensitive drum and is configured to form a developer image on the recording material fed to the image forming module by the feeding module, and a fixing module configured to fix the developer image formed by the image forming module to the recording material, wherein the image forming module includes a scanner frame configured to support an exposure unit configured to expose the photosensitive drum, and wherein the feeding module is installed on the scanner frame.

Further features of the present disclosure will become apparent from the following description of exemplary embodiments with reference to the attached drawings.

DESCRIPTION OF THE EMBODIMENTS

Now, embodiments of the present disclosure are described in detail with reference to the drawings.

[Configuration of Image Forming Apparatus]

Figure 1:
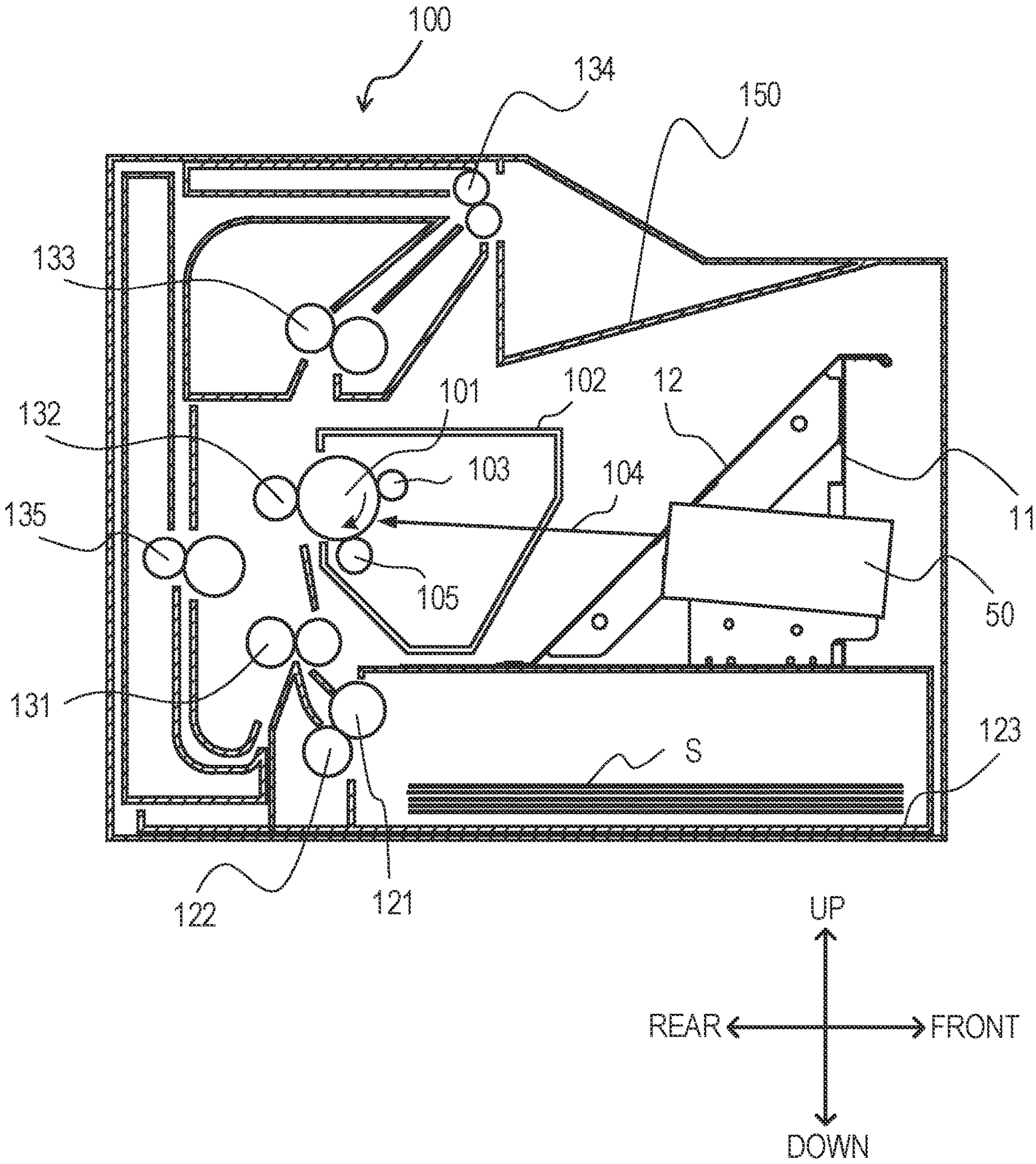
FIG. 1 is a sectional view for illustrating a configuration of an image forming apparatus.

FIG. 1 is a schematic sectional view for illustrating a configuration of an image forming apparatus 100. First, a configuration and an image forming operation of the image forming apparatus 100 are described. The image forming apparatus 100 includes a feeding portion, an image forming portion, and a fixing device. The feeding portion is configured to feed a sheet S being a recording material (recording sheet). The image forming portion includes, for example, a process cartridge (hereinafter, referred to as "cartridge") 102 configured to form a toner image (developer image) on the sheet S. The fixing device is configured to fix the toner image on the sheet S.

The cartridge 102 includes a photosensitive drum 101, a charging roller 103, and a developing roller 105. The photosensitive drum 101 is an image bearing member that is freely rotatable without meaningful restriction. The charging roller 103 is configured to charge the photosensitive drum 101. The developing roller 105 is configured to develop an electrostatic latent image formed on the photosensitive drum 101 with toner (developer). The photosensitive drum 101 receives a driving force transmitted to one end portion of a rotation shaft of the photosensitive drum 101 by a driving motor (not shown) and a drive transmission portion (not shown) so as to be driven to rotate in the direction (clockwise direction) indicated by the arrow of FIG. 1.

The photosensitive drum 101 has an organic photoconductor layer applied on a surface thereof. When a charging bias is applied to the charging roller 103, the surface of the photosensitive drum 101 is charged to a uniform potential. The photosensitive drum 101 having the surface charged to the uniform potential is irradiated with a laser beam 104 corresponding to image information by an exposure unit 50. The laser beam 104 scans the photosensitive drum 101 so that an electrostatic latent image is formed on the photosensitive drum 101. Then, the electrostatic latent image formed on the photosensitive drum 101 is developed with toner by the developing roller 105, and thus is visualized as a toner image.

Meanwhile, the feeding portion includes, for example, a feeding roller 121, a separation roller 122, and a feeding tray 123, and the sheets S being the recording material are stacked on the feeding tray 123. The sheets S are fed by the feeding roller 121 that is driven by the driving motor (not shown) and the drive transmission portion (not shown), and only one sheet S is fed by a conveyance roller pair 131 owing to a frictional force of the separation roller 122. Then, the sheet S is conveyed by the conveyance roller pair 131 to a transfer nip portion at which the photosensitive drum 101 and a transfer roller (transfer member) 132 are held in abutment against each other. At the transfer nip portion, when a predetermined transfer bias is applied to the transfer roller 132, the toner image formed on the photosensitive drum 101 is transferred onto the sheet S.

The sheet S having the toner image transferred thereon is then conveyed to the fixing device so as to be subjected to fixing processing of fixing the unfixed toner image on the sheet S. In the fixing device, the sheet S is nipped and conveyed by a fixing roller pair 133 (including a pressure roller and a flexible sleeve), and the toner image is melted and fixed on the sheet S by heat and pressure treatment. The sheet S conveyed by the fixing roller pair 133 is conveyed to a delivery roller pair 134, and then is delivered onto and stacked on a delivery tray 150. In this manner, image formation is finished. When duplex printing is performed on the sheet S, the sheet S having the toner image fixed on one surface thereof by the fixing device is conveyed by the delivery roller pair 134 into a duplex-printing conveyance path, in which a duplex-printing conveyance roller 135 is provided, so as to be subjected to printing on another surface of the sheet S. The sheet S conveyed into the duplex-printing conveyance path is conveyed by the duplex-printing conveyance roller 135 to the transfer nip portion again, and a toner image formed on the photosensitive drum 101 is transferred onto the another surface. Then, the sheet S is conveyed to the fixing device again, and the unfixed toner image is fixed on the sheet S by the heat and pressure treatment. After that, the sheet S is conveyed to the delivery roller pair 134, and then is delivered onto and stacked on the delivery tray 150. In this manner, image formation is finished.

First Embodiment

[Module Stacking Frame]

Figure 2:
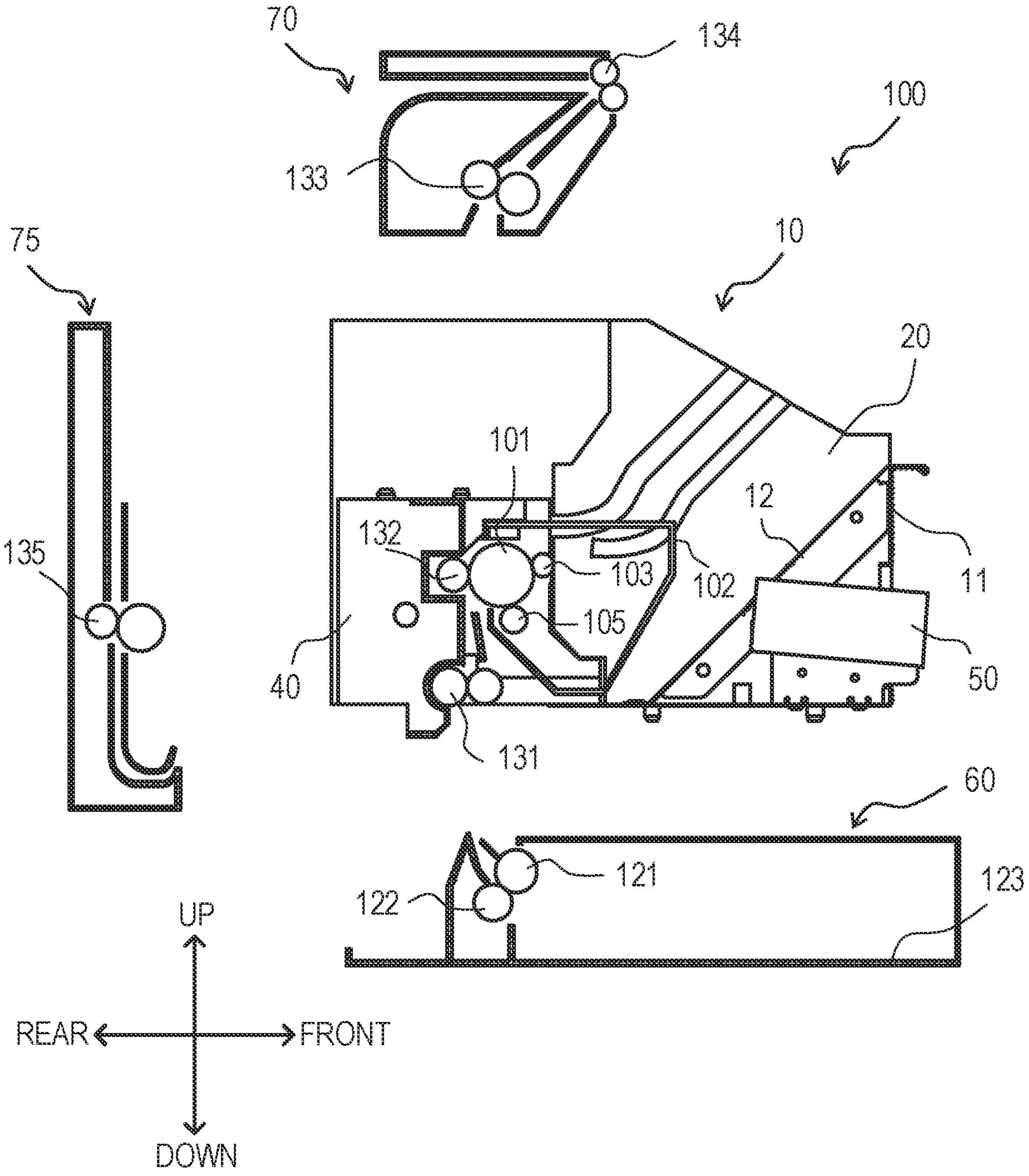
FIG. 2 is a sectional view for illustrating a state in which an image forming apparatus according to a first embodiment is disassembled into functional modules.
Figure 3:
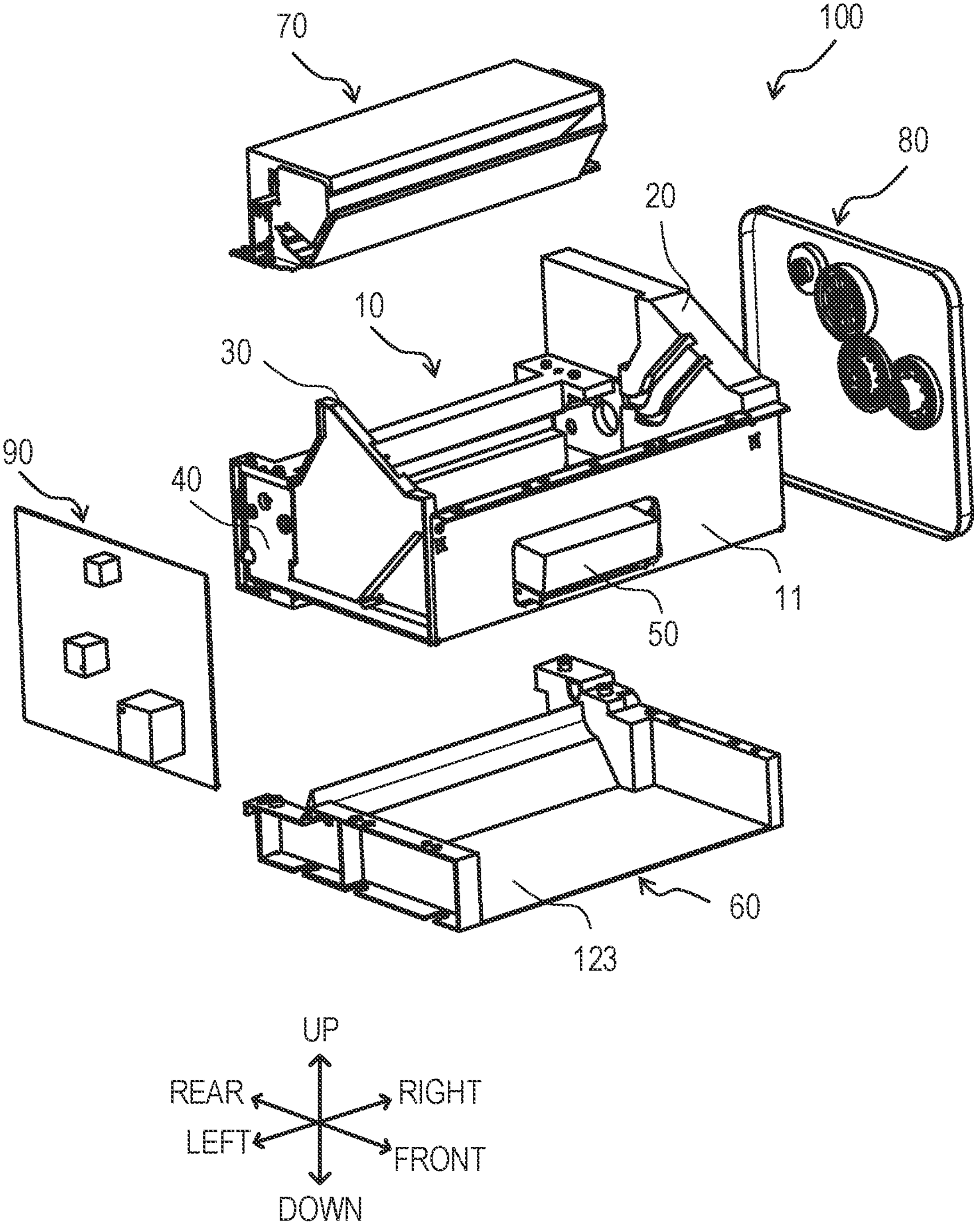
FIG. 3 is a perspective view for illustrating a state in which the image forming apparatus according to the first embodiment is disassembled into the functional modules.

Next, a module stacking frame in a first embodiment is described with reference to FIG. 1 to FIG. 3. In the image forming apparatus 100 illustrated in FIG. 1, modules having different functions are combined with and assembled to each other, and thus form the image forming apparatus 100. FIG. 2 is a sectional view for illustrating the functional modules of the image forming apparatus 100 of FIG. 1. FIG. 3 is a perspective view for illustrating the functional modules of the image forming apparatus 100 of FIG. 1 except a duplex-printing conveyance module 75. In the following description, an upstream side and a downstream side in a direction of delivering the sheet S from the delivery roller pair 134 of the image forming apparatus 100 correspond to "rear" and "front", respectively. Further, when the image forming apparatus 100 is seen from the "front" toward the "rear", a right side and a left side in an axial direction of the photosensitive drum 101 correspond to "right" and "left", respectively, and a vertically upper side and a vertically lower side in the axial direction of the photosensitive drum 101 correspond to "up" and "down", respectively. As illustrated in FIG. 2 and FIG. 3, the image forming apparatus 100 mainly includes six functional modules, specifically, an image forming module 10, a feeding module 60, a fixing module 70, the duplex-printing conveyance module 75, a driving module 80, and an electrical equipment module 90.

The image forming module 10 includes the cartridge 102 configured to form an image on the sheet S, the exposure unit 50, a scanner frame 11, a scanner reinforcement plate 12, a right side plate 20, a left side plate 30, and a transfer frame 40 configured to support the transfer roller 132. Details of the image forming module 10 are described later. The feeding module 60 includes the feeding roller 121 configured to feed the sheet S to the image forming module 10, the separation roller 122, and the feeding tray 123. The fixing module 70 includes the fixing roller pair 133 and the delivery roller pair 134. The fixing roller pair 133 is configured to fix the toner image on the sheet S, and convey the sheet S having the toner image fixed thereon. The duplex-printing conveyance module 75 includes the duplex-printing conveyance roller 135 and the duplex-printing conveyance path. The duplex-printing conveyance roller 135 is configured to convey the sheet S conveyed by the delivery roller pair 134 to the image forming module 10. The driving module 80 includes the driving motor (not shown) and the drive transmission portion (not shown) configured to drive the photosensitive drum 101 and the feeding roller 121 described above. The electrical equipment module 90 includes a control unit (not shown) configured to control the image forming apparatus 100, and a power supply device (not shown).

The image forming apparatus 100 according to the first embodiment includes the module stacking frame obtained by assembling and stacking the necessary functional modules. In such a module stacking frame, the plurality of functional modules described above are prepared, and the necessary functional modules are assembled together in accordance with specifications for a product, thereby being capable of covering a wide range of product lineup.

[Configuration of Image Forming Module]

Figure 4A:
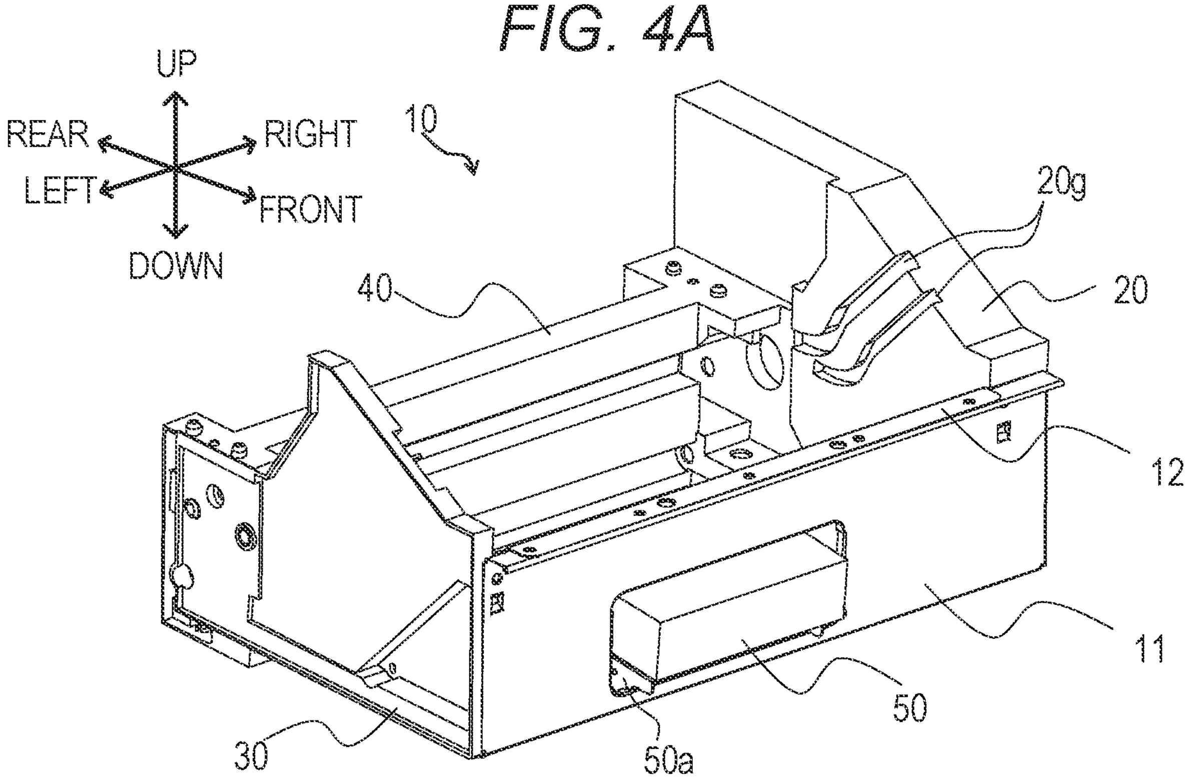
FIG. 4A, FIG. 4B, and FIG. 4C are views for illustrating a configuration of an image forming module in the first embodiment.
Figure 4B:
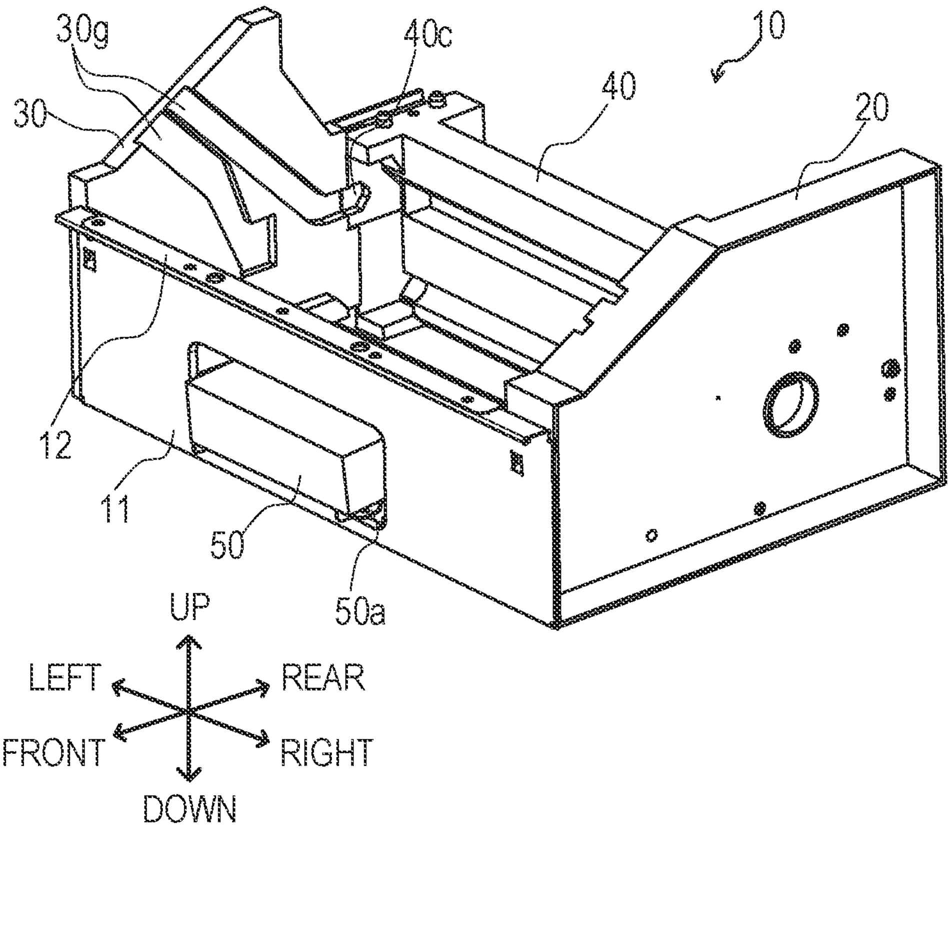
Figure 4C:
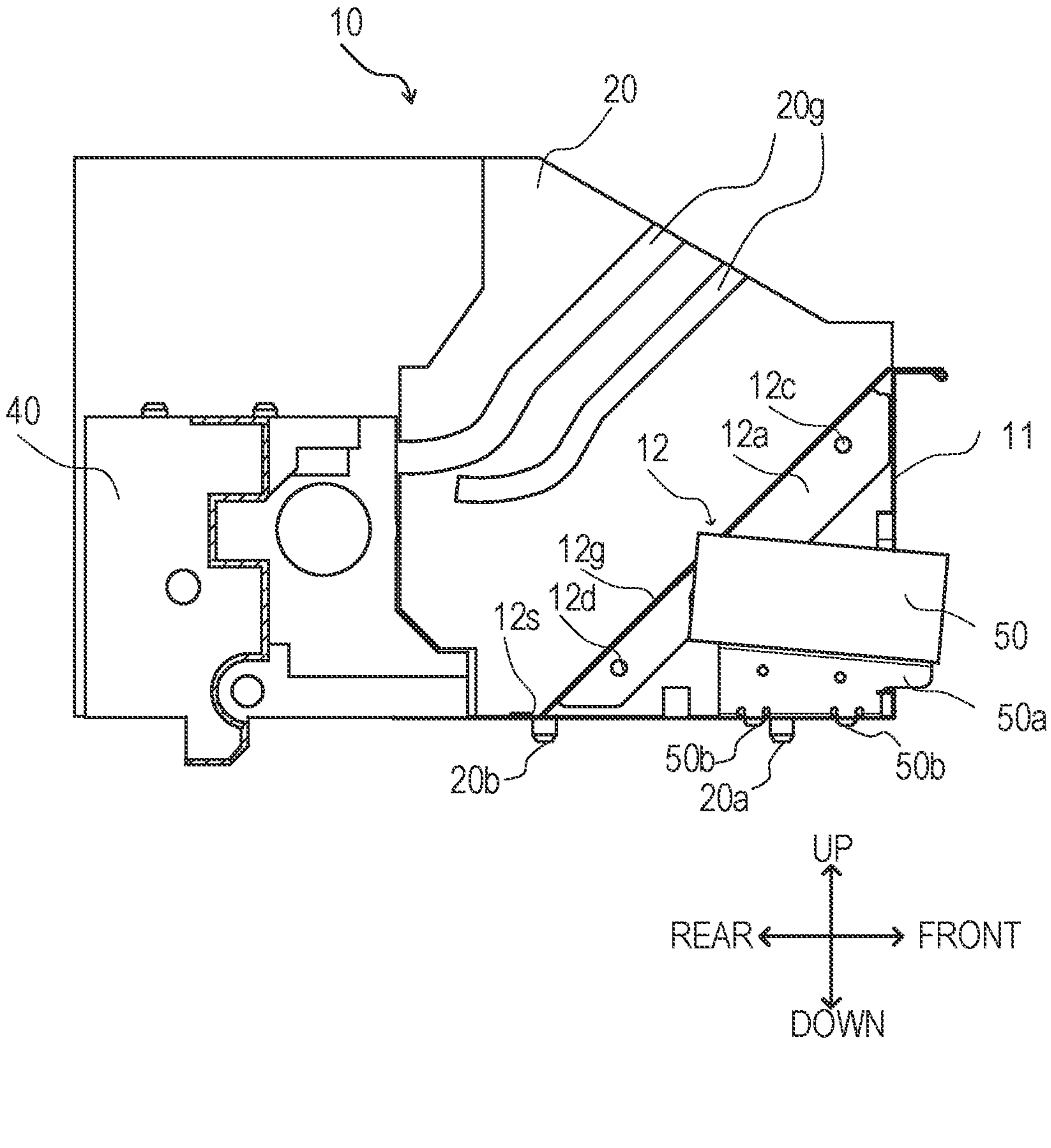
Figure 5:
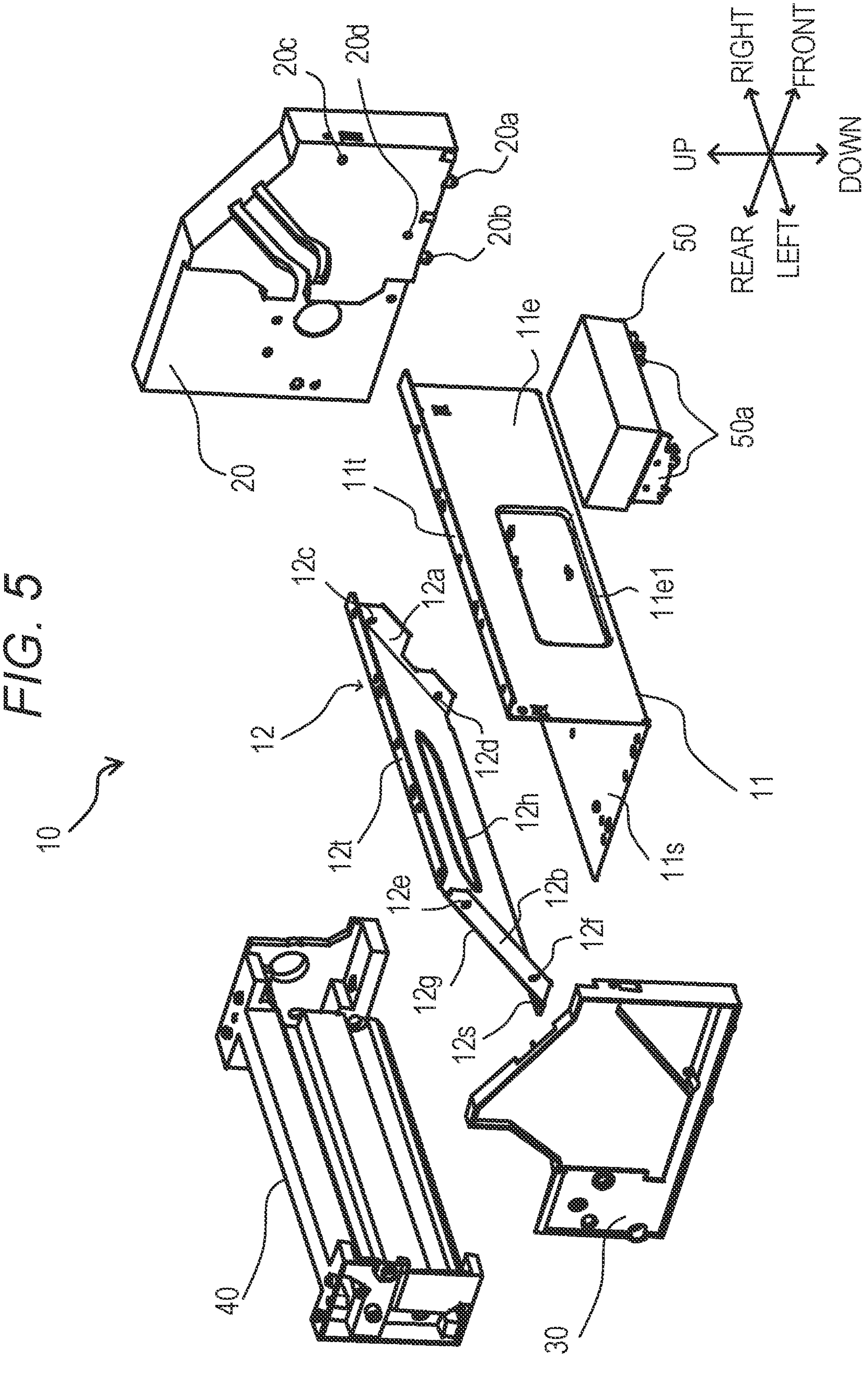
FIG. 5 is an exploded view for illustrating the image forming module in the first embodiment.
Figure 6A:
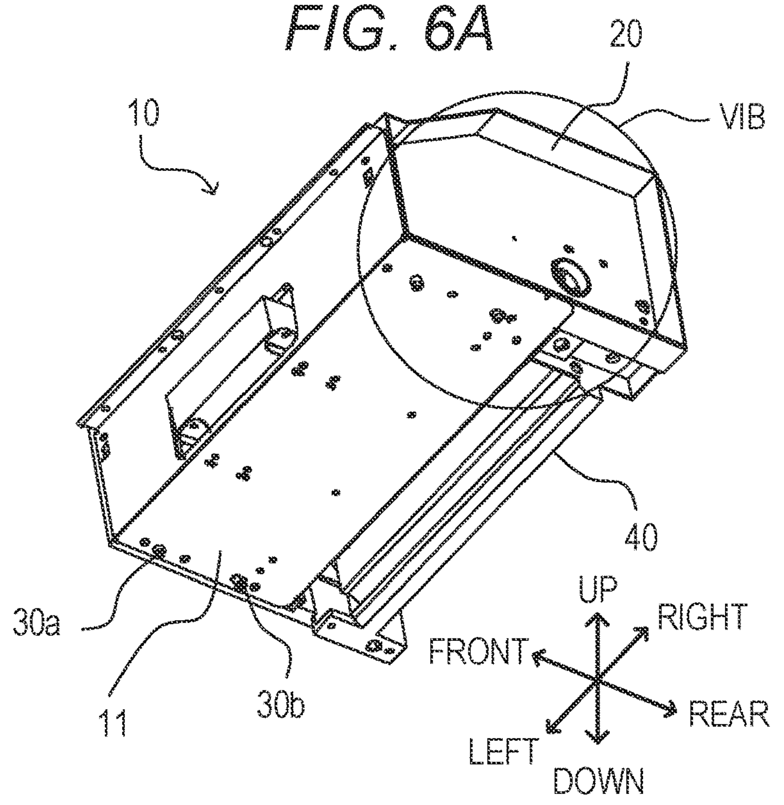
FIG. 6A and FIG. 6B are views for illustrating an assembly configuration of components of the image forming module in the first embodiment.
Figure 6B:
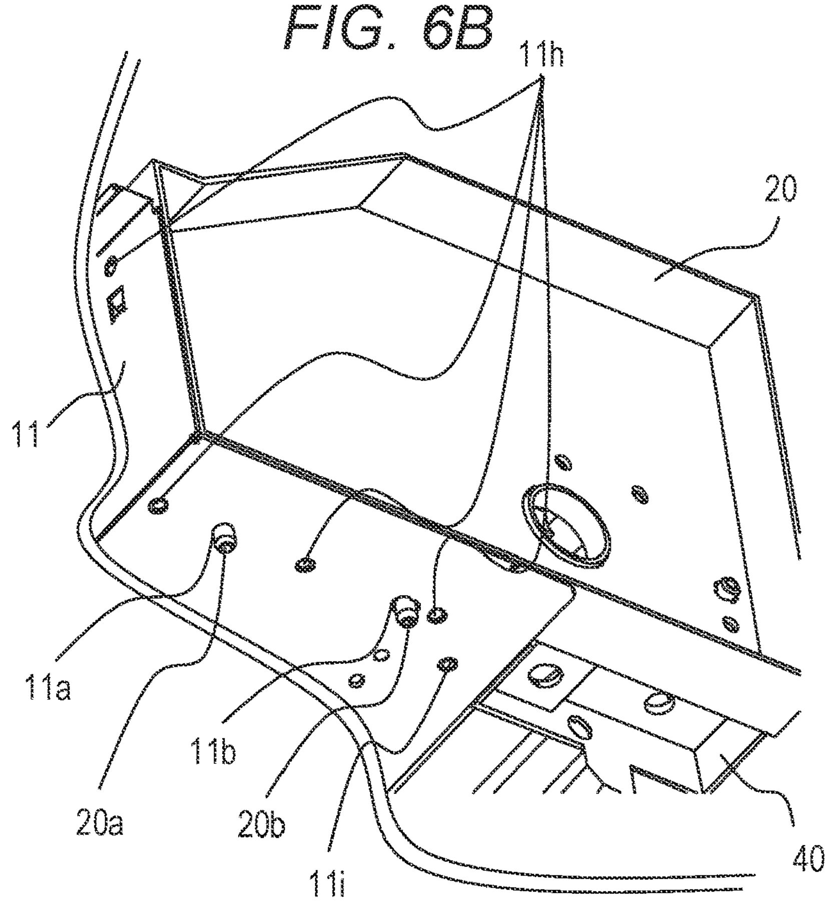

Next, the image forming module 10 in the first embodiment is described with reference to FIG. 4A, FIG. 4B, FIG. 4C, FIG. 5, FIG. 6A, and FIG. 6B. Here, FIG. 4A, FIG. 4B, and FIG. 4C are views for illustrating the image forming module 10 in the first embodiment. FIG. 4A is a perspective view for illustrating the image forming module 10 as seen from an upper left side thereof. FIG. 4B is a perspective view for illustrating the image forming module 10 as seen from an upper right side thereof. FIG. 4C is a sectional view for illustrating the image forming module 10. FIG. 5 is an exploded view for illustrating components of the image forming module 10. FIG. 6A and FIG. 6B are views for illustrating an assembly configuration of the components of the image forming module 10. As illustrated in FIG. 4A, FIG. 4B, FIG. 4C, FIG. 5, FIG. 6A, and FIG. 6B, the image forming module 10 in the first embodiment includes the exposure unit 50, the scanner frame 11, the scanner reinforcement plate 12, the right side plate 20, the left side plate 30, and the transfer frame 40.

As illustrated in FIG. 5, the scanner frame 11 includes a first face 11*s*, a second face 11*e*, and a support portion 11*t*. On the first face 11*s*, the plurality of components of the image forming module 10 are to be mounted. The second face 11*e* has one end connected to the first face 11*s*, and extends in an angular manner from (intersects with) the first face 11*s*. The support portion 11*t* is connected to another end of the second face 11*e*. In the first embodiment, the first face 11*s* is a surface extending in a horizontal direction, and the second face 11*e* is a surface extending in a vertical direction perpendicular to the first face 11*s*. Further, the support portion 11*t* is a surface extending in an angular manner from (intersecting with) the second face 11*e* in a direction of separating from the scanner reinforcement plate 12. Meanwhile, the scanner reinforcement plate 12 is arranged so as to overlap the support portion 11*t* of the scanner frame 11. The scanner reinforcement plate 12 includes a first fixing portion 12*t*, an inclined face portion 12*g*, and a second fixing portion 12*s*. The first fixing portion 12*t* is fixed to the support portion 11*t*. The inclined face portion 12*g* extends in a direction of inserting and removing the cartridge 102. The second fixing portion 12*s* is fixed to the first face 11*s* of the scanner frame 11. One end of the scanner reinforcement plate 12 is connected to the first face 11*s* of the scanner frame 11, and another end of the scanner reinforcement plate 12 is connected to the second face 11*e* (or the support portion 11*t*) of the scanner frame 11. Thus, the scanner frame 11 and the scanner reinforcement plate 12 form a structural body having a triangular cross section. Here, the support portion 11*t* is a portion that enables the scanner reinforcement plate 12 to be connected to the second face 11*e* of the scanner frame 11. Accordingly, a configuration in which another end of the scanner reinforcement plate 12 is connected to the second face 11*e* is described on the assumption that the support portion 11*t* is a part of the second face 11*e*. In the scanner frame 11 and the scanner reinforcement plate 12, the support portion 11*t* and the first fixing portion 12*t* are fixed to each other with screws (not shown), and the first face 11*s* and the second fixing portion 12*s* are fixed to each other with screws (not shown). The fixing method is not limited to the use of screws, and may be caulking or use of an adhesive.

The exposure unit 50 is fixed under a state in which at least a part of the exposure unit 50 enters a space surrounded by the scanner frame 11 and the scanner reinforcement plate 12. At this time, the laser beam emitted from the exposure unit 50 can be radiated to the photosensitive drum 101 through an opening portion 12*h* formed in the inclined face portion 12*g* of the scanner reinforcement plate 12. Further, in the first embodiment, a through-hole 11*e*1 is formed in the second face 11*e*. The exposure unit 50 is arranged such that a part of the exposure unit 50 protrudes from the through-hole 11*e*1 of the second face 11*e* toward the front side of the image forming module 10.

Here, the exposure unit 50 is fixed to the first face 11*s* of the scanner frame 11 through intermediation of two scanner stays 50*a*. The scanner stays 50*a* include bosses 50*b* (FIG. 4C) being positioning portions. The scanner stays 50*a* are fixed to the first face 11*s* under a state of being inserted in holes formed in the first face 11*s* of the scanner frame 11. Thus, the exposure unit 50 can be positioned with respect to the first face 11*s* and to the scanner frame 11, and can be arranged at a predetermined position.

Further, the right side plate 20 (first side plate) and the left side plate 30 (second side plate) are fixed to the first face 11*s* of the scanner frame 11, and form a right side surface and a left side surface of the image forming module 10, respectively. The right side plate 20 includes insertion/removal guide portions 20*g* (FIG. 4A), and the left side plate 30 includes insertion/removal guide portions 30*g* (FIG. 4B). The insertion/removal guide portions 20*g* and the insertion/removal guide portions 30*g* are configured to guide the cartridge 102 at the time of mounting and dismounting the cartridge 102 that is detachably mountable to the image forming module 10. That is, the cartridge 102 of the image forming module 10 can be mounted to and dismounted from the image forming apparatus 100 while both ends (one end portion and another end portion) of the photosensitive drum 101 are guided by the insertion/removal guide portions 20*g* of the right side plate 20 and the insertion/removal guide portions 30*g* of the left side plate 30.

With reference to FIG. 6A and FIG. 6B, mounting of the components of the image forming module 10 is described. FIG. 6A is a perspective view for illustrating the image forming module 10 of FIG. 4A and FIG. 4B as seen from a lower right side thereof. FIG. 6B is an enlarged view for illustrating a portion VIB enclosed in the circle of FIG. 6A. The right side plate 20 includes bosses 20*a* and 20*b*. The right side plate 20 is superposed vertically above the first face 11*s* of the scanner frame 11, and the bosses 20*a* and 20*b* of the right side plate 20 are respectively inserted into boss holes 11*a* and 11*b* formed in the first face 11*s*, thereby positioning the right side plate 20 with respect to the scanner frame 11 (FIG. 6B). Under this state, screws are fitted into fitting holes (not shown) of the right side plate 20 through fitting holes 11*h* formed in the first face 1 is of the scanner frame 11. In this manner, the right side plate 20 is fixed (screw-fastened) to the first face 11*s* of the scanner frame 11. Further, the left side plate 30 includes bosses 30*a* and 30*b* similarly to the right side plate 20. The left side plate 30 is superposed vertically above the first face 11*s* of the scanner frame 11, and the bosses 30*a* and 30*b* are respectively inserted into boss holes formed in the first face 11*s*, thereby positioning the left side plate 30 with respect to the scanner frame 11. Under this state, screws are fitted into fitting holes (not shown) of the left side plate 30 through fitting holes formed in the first face 11*s* of the scanner frame 11. In this manner, the left side plate 30 is fixed (screw-fastened) to the first face 11*s* of the scanner frame 11.

Moreover, the right side plate 20 has fitting holes 20*c* and 20*d* (FIG. 5), and the left side plate 30 has fitting holes (not shown). Meanwhile, as shown in FIG. 5, the scanner reinforcement plate 12 includes a right side face portion 12*a* (first fastening surface) and a left side face portion 12*b* (second fastening surface). The right side face portion 12*a* has fitting holes 12*c* and 12*d* through which the scanner reinforcement plate 12 is fixed to the right side plate 20. The left side face portion 12*b* has fitting holes 12*e* and 12*f* through which the scanner reinforcement plate 12 is fixed to the left side plate 30.

Regarding the right side plate 20, through the fitting holes 20*c* and 20*d* formed in the right side plate 20, screws are fitted into the fitting holes 12*c* and 12*d* of the right side face portion 12*a* of the scanner reinforcement plate 12. In this manner, the right side plate 20 is fixed (screw-fastened) to the scanner reinforcement plate 12. Similarly, regarding the left side plate 30, through the fitting holes (not shown) formed in the left side plate 30, screws are fitted into the fitting holes 12*e* and 12*f* of the left side face portion 12*b* of the scanner reinforcement plate 12. In this manner, the left side face portion 12*b* is fixed (screw-fastened) to the scanner reinforcement plate 12.

The right side plate 20 and the left side plate 30 in the first embodiment are each made of a resin. When the right side plate 20 and the left side plate 30 are each made of a resin, complicated shapes of the insertion/removal guide portions 20*g* and 30*g* for the cartridge 102, and complicated shapes of mounting portions for the necessary functional modules such as the driving module 80 and the electrical equipment module 90 can be easily formed.

Further, the transfer frame 40 is arranged vertically above the first face 11*s* of the scanner frame 11, and a screw is fitted into a fitting hole (not shown) of the transfer frame 40 through a fitting hole 11*i* (FIG. 6B) formed in the first face 11*s*. In this manner, the transfer frame 40 is fixed (screw-fastened) to the scanner frame 11. Moreover, regarding the transfer frame 40, through fitting holes (not shown) of the right side plate 20 and the left side plate 30, screws are fitted into fitting holes formed in the transfer frame 40. In this manner, the right side plate 20 and the left side plate 30 are fixed (screw-fastened) to the transfer frame 40. The transfer frame 40 includes positioning portions 40*c* (FIG. 4B) each having a V shape. When the cartridge 102 is mounted to the image forming apparatus 100, the both ends of the photosensitive drum 101 are brought into abutment against the positioning portions 40*c*, respectively, and thus the photosensitive drum 101 and the cartridge 102 are positioned. In addition, in the first embodiment, the transfer frame 40 is made of a resin, and includes a sheet conveyance guide on an upstream side and a downstream side of the photosensitive drum 101 in a direction of conveying the sheet S.

Figure 7A:
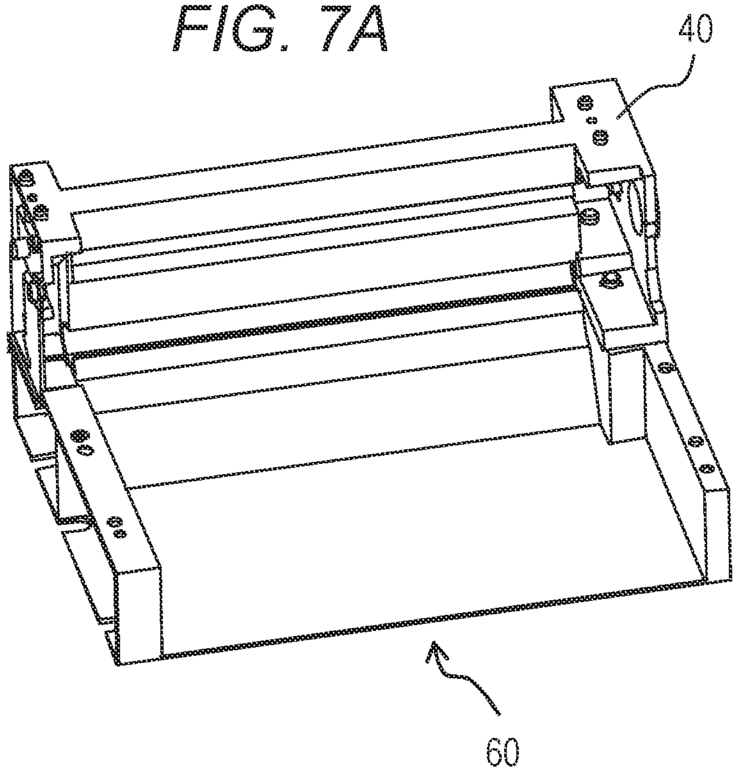
FIG. 7A and FIG. 7B are perspective views for illustrating the image forming module and a feeding module in the first embodiment.
Figure 7B:
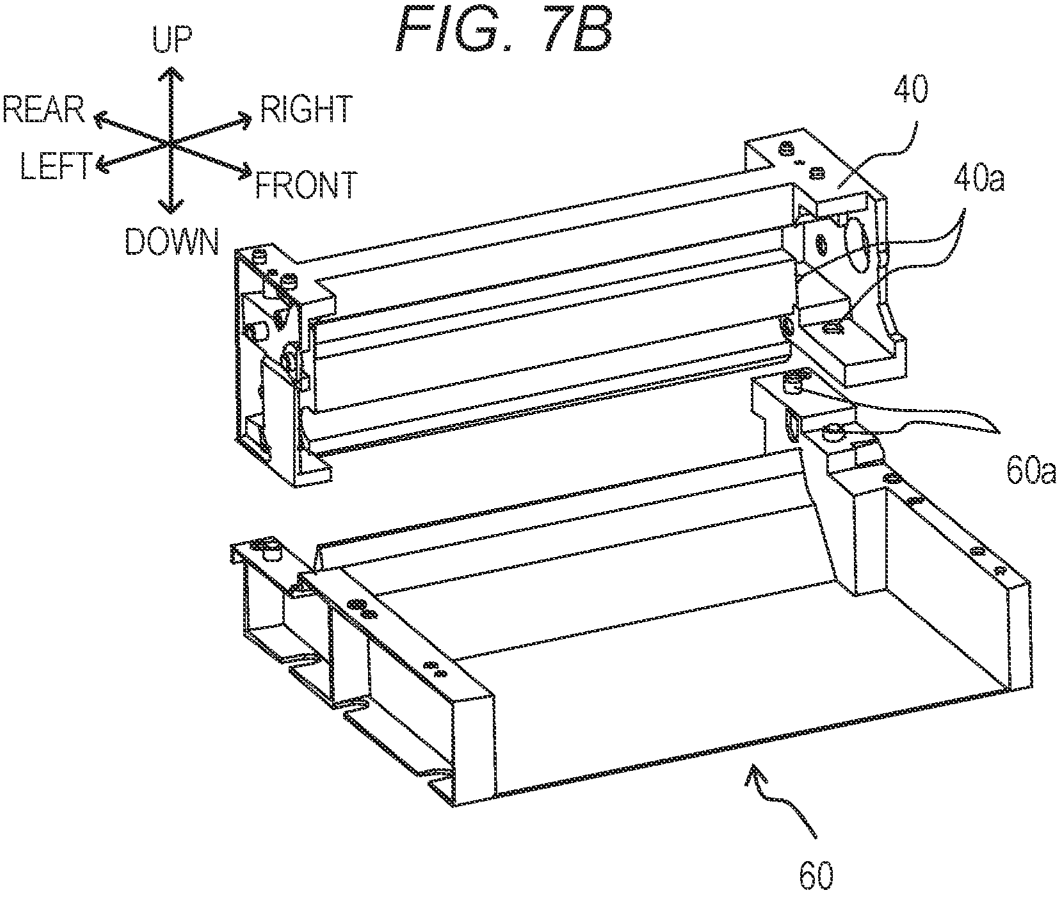

To the transfer frame 40 fixed to the scanner frame 11, the feeding module 60 is fixed below the transfer frame 40. FIG. 7A and FIG. 7B are perspective views for illustrating how to mount the feeding module 60 to the transfer frame 40 forming the image forming module 10. FIG. 7A is a perspective view for illustrating a state in which the feeding module 60 is mounted to the transfer frame 40 as seen from the upper left side of the image forming module 10. FIG. 7B is an exploded perspective view for illustrating how to mount the feeding module 60 to the transfer frame 40. Under a state in which bosses 60*a* of the feeding module 60 are inserted into boss holes 40*a* formed in the transfer frame 40 and thus the feeding module 60 is positioned with respect to the transfer frame 40, the feeding module 60 is fixed (screw-fastened) to the transfer frame 40 with screws (not shown).

Figure 8A:
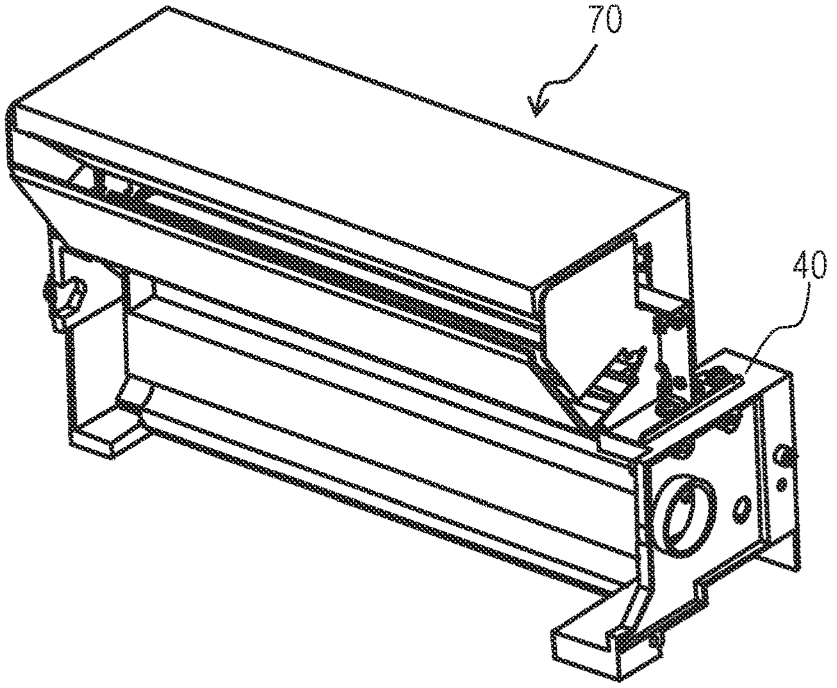
FIG. 8A and FIG. 8B are perspective views for illustrating the image forming module and a fixing module in the first embodiment.
Figure 8B:
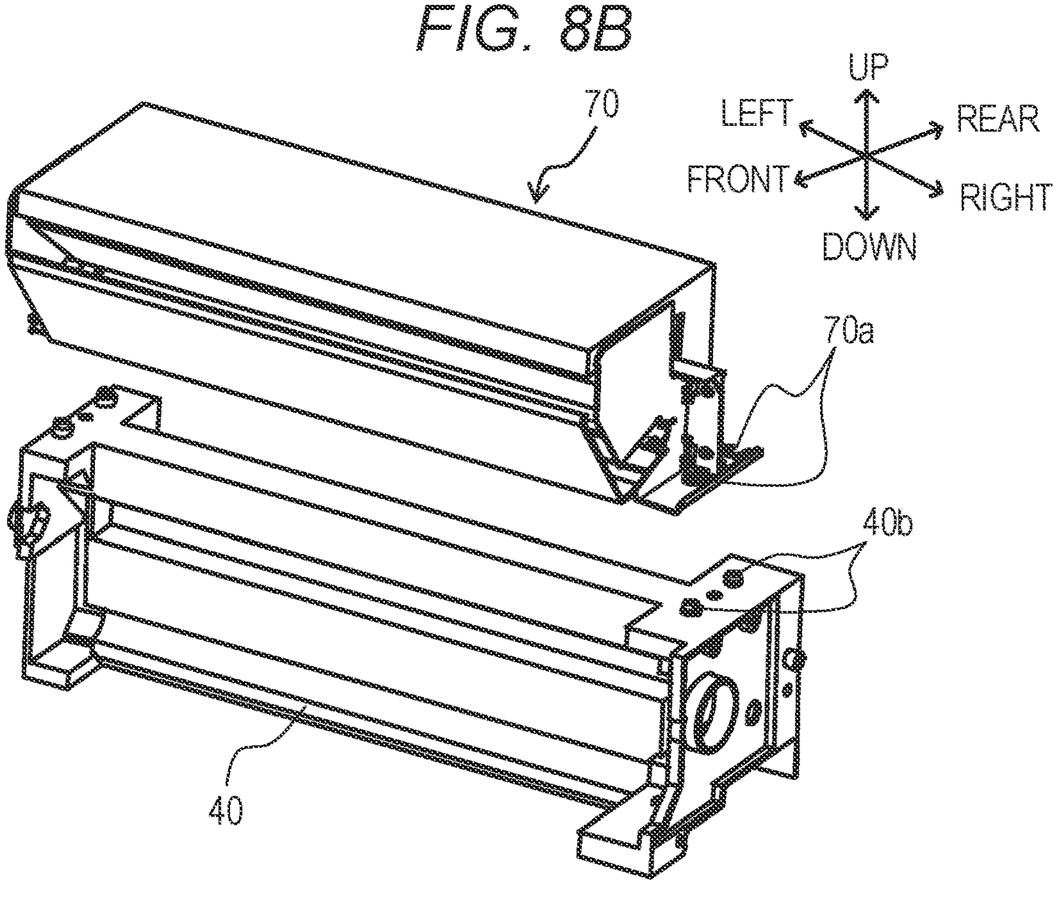

Moreover, to the transfer frame 40 fixed to the scanner frame 11, the fixing module 70 is fixed above the transfer frame 40. FIG. 8A and FIG. 8B are perspective views for illustrating how to mount the fixing module 70 to the transfer frame 40 forming the image forming module 10. FIG. 8A is a perspective view for illustrating a state in which the fixing module 70 is mounted to the transfer frame 40 as seen from the upper right side of the image forming module 10. FIG. 8B is an exploded perspective view for illustrating how to mount the fixing module 70 to the transfer frame 40. Under a state in which bosses 40*b* formed on the transfer frame 40 are inserted into boss holes 70*a* of the fixing module 70 and thus the fixing module 70 is positioned with respect to the transfer frame 40, the fixing module 70 is fixed (screw-fastened) to the transfer frame 40 with screws (not shown).

As shown in FIG. 3, the image forming module 10 has the configuration in which the scanner reinforcement plate 12, the exposure unit 50, the right side plate 20, the left side plate 30, and the transfer frame 40 are fixed to the scanner frame 11, and the feeding module 60 and the fixing module 70 are fixed to the transfer frame 40. More specifically, the exposure unit 50, the scanner reinforcement plate 12, the right side plate 20, the left side plate 30, and the transfer frame 40 are installed from vertically above so as to be placed on the first face 11*s* of the scanner frame 11. Therefore, the components of the image forming module 10 can be positioned in a height direction (vertical direction) of a main body of the image forming module 10 with the first face 11*s*, on which the components are to be installed, being used as a reference plane.

Further, in the first embodiment, the right side plate 20, the left side plate 30, the transfer frame 40, the scanner reinforcement plate 12, and the exposure unit 50 are installed on the scanner frame 11 that is a single component forming the reference plane of the image forming module 10. With this configuration, misalignment of the components can be minimized, and the components can be assembled together with the image forming module 10 including the scanner frame 11 and the exposure unit 50 being used as a reference. As a result, misalignment of a laser beam irradiation position on the photosensitive drum 101 irradiated with the laser beam emitted from the exposure unit 50 can be minimized, thereby being capable of realizing the image forming apparatus having high printing accuracy.

Moreover, the scanner reinforcement plate 12 is combined with the scanner frame 11 that retains the exposure unit 50. Accordingly, the scanner frame 11 has a sturdy configuration so as to be less liable to deform due to an external force. When the right side plate 20, the left side plate 30, and the transfer frame 40 are fixed to the scanner frame 11 attaining the sturdy configuration owing to combination with the scanner reinforcement plate 12, only a portion that causes a defect in image formation due to deformation can be reinforced. Thus, misalignment of the laser beam irradiation position irradiated with the laser beam emitted from the exposure unit 50, which is caused by distortion or strain of the frame, can be minimized at low cost, thereby being capable of realizing the image forming apparatus having high printing accuracy.

Further, the feeding module 60 and the fixing module 70 are positioned and fixed to the transfer frame 40, and the photosensitive drum 101 and the cartridge 102 are positioned by the positioning portions 40*c* of the transfer frame 40. With this configuration, misalignment of the rollers on the upstream side and the downstream side of the photosensitive drum 101 in the direction of conveying the sheet S is minimized, and hence stable sheet conveyance can be achieved, thereby being capable of realizing the image forming apparatus having high printing accuracy.

As described above, according to the first embodiment, occurrence of the misalignment in the image forming module can be prevented, and rigidity can be secured.

Figure 9A:
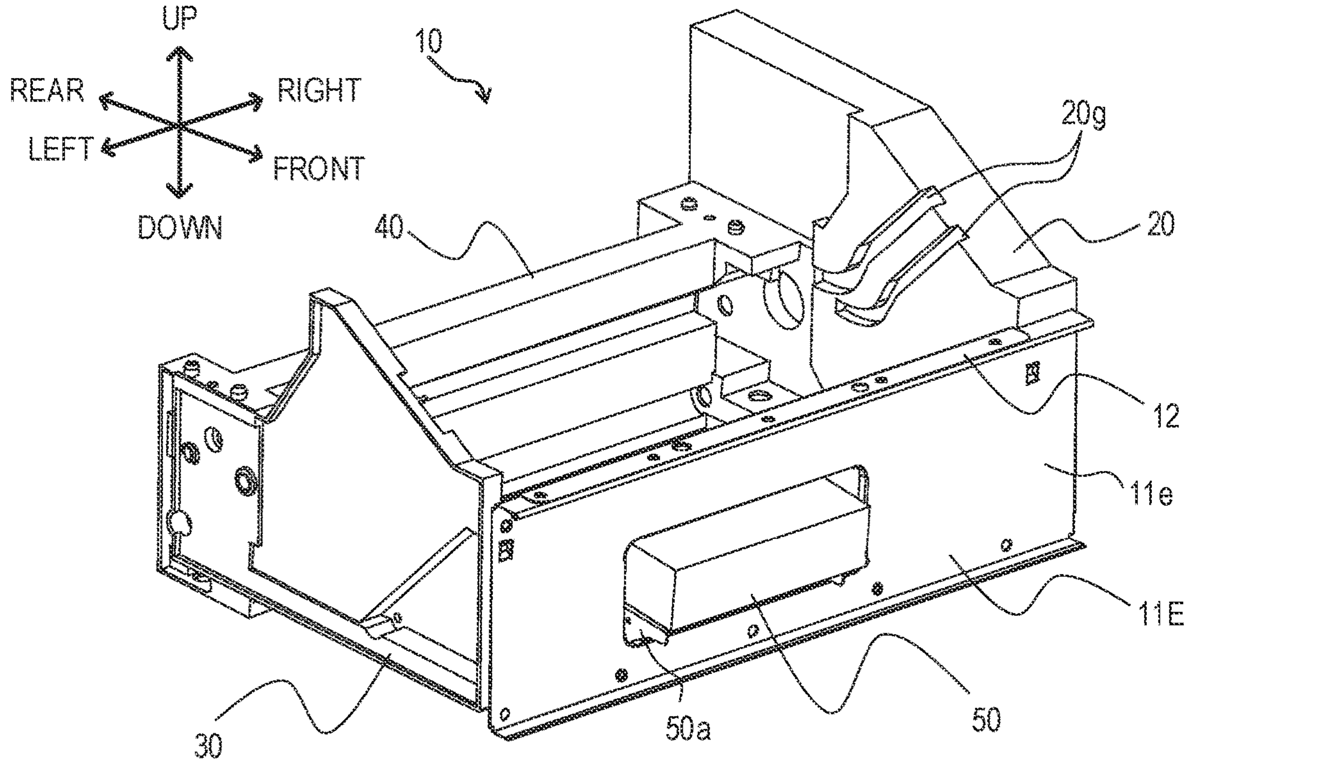
FIG. 9A, FIG. 9B, and FIG. 9C are views for illustrating a configuration of the image forming module in Modification Example 1 of the first embodiment.
Figure 9B:
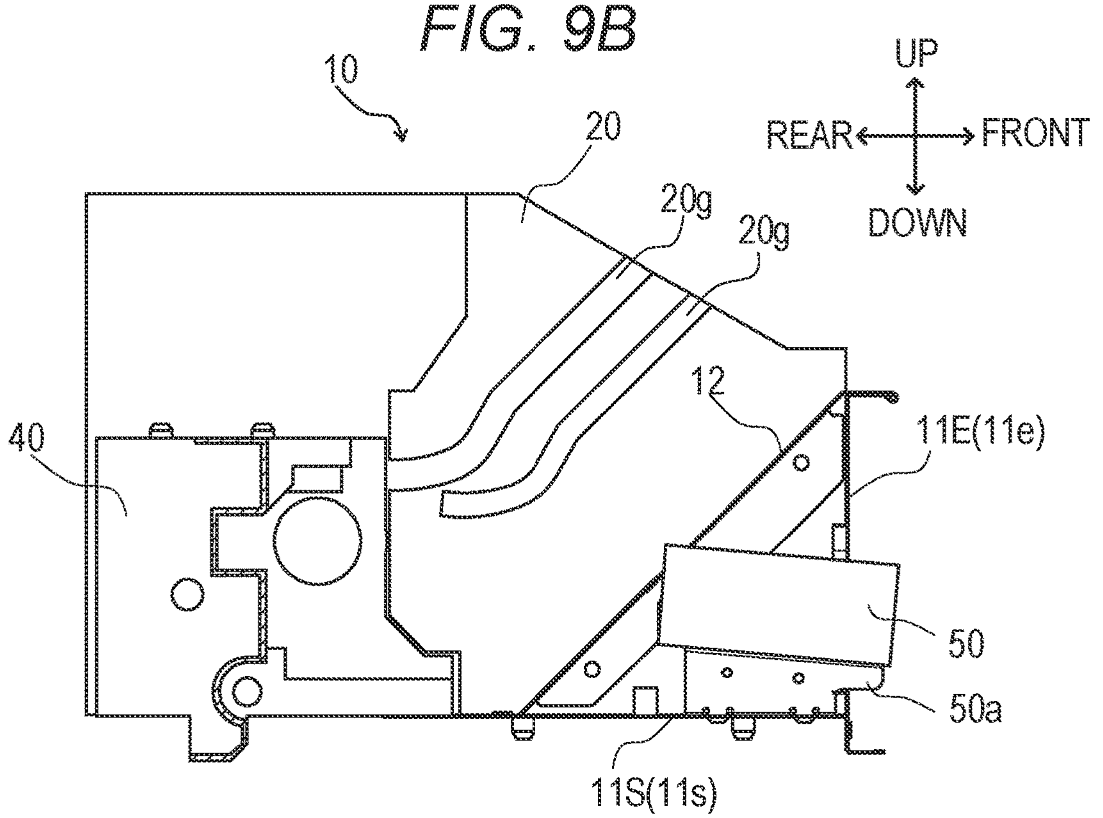
Figure 9C:
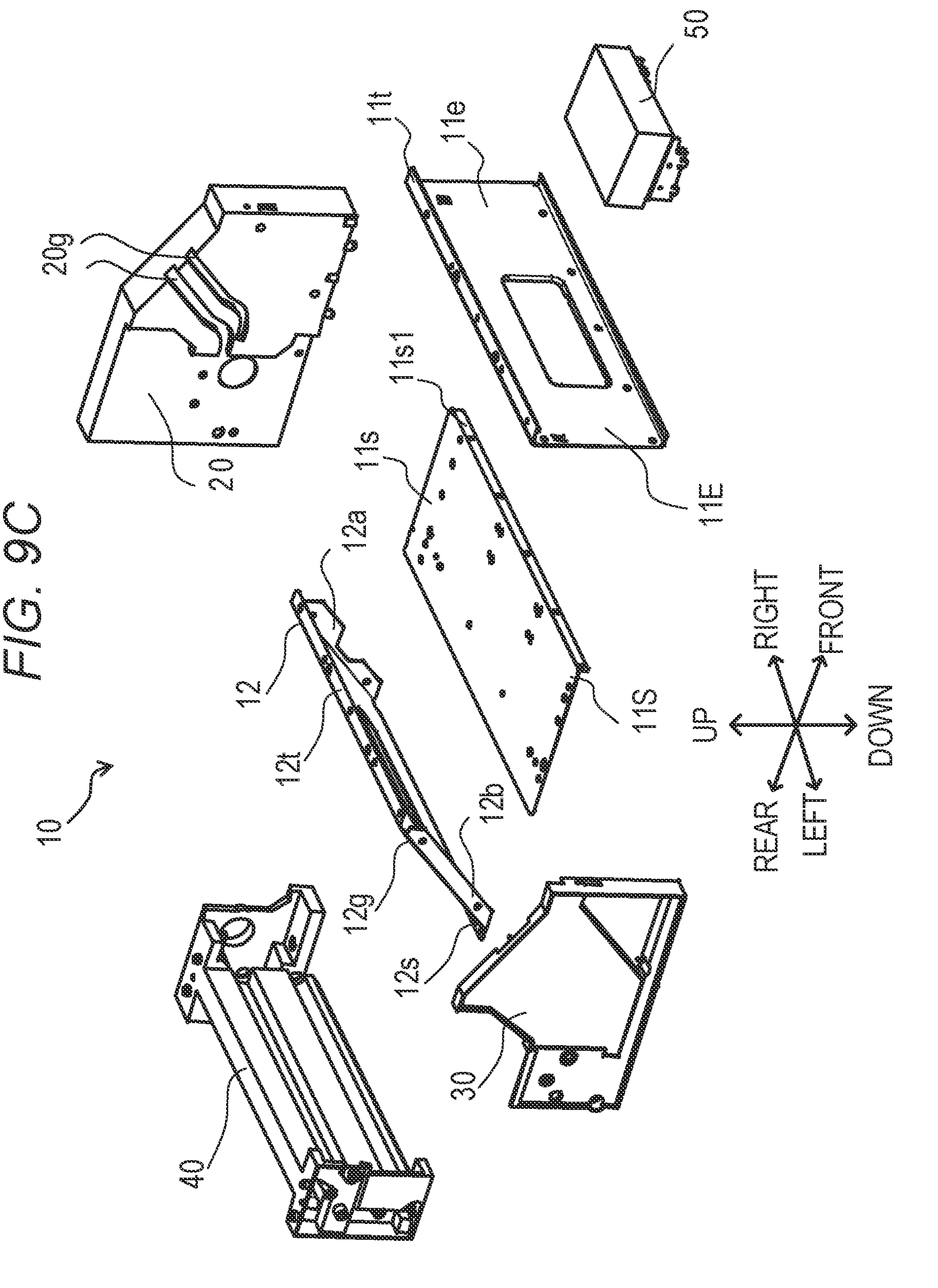

In the first embodiment, the scanner frame 11 formed of a single component is used, but the present disclosure is not limited thereto. For example, as illustrated in FIG. 9A, FIG. 9B, and FIG. 9C, there may also be adopted a configuration in Modification Example 1 in which the scanner frame is formed of two components. In this case, the scanner frame includes a first member 11S and a second member 11E. The first member 11S corresponds to the first face 11*s* forming an installation face for the components of the image forming module 10. The second member 11E corresponds to the second face 11*e* arranged in a front surface of the image forming module 10. In Modification Example 1, the first member 11S includes a fixing face 11*s* that is bent in a direction of extending in an angular manner from (in an intersection direction with) the first face 11*s*, and has a plurality of fitting holes. Meanwhile, the second member 11E includes the second face 11*e*, and the support portion 11*t* connected to the another end of the second face 11*e*. Screws (not shown) are fitted to the one end of the second face 11*e* of the second member 11E through the fitting holes of the fixing face 11*s*1. In this manner, the first member 11S and the second member 11E are fixed (screw-fastened) to each other. Thus, the first member 11S and the second member 11E may form a configuration corresponding to the scanner frame 11 in the first embodiment.

Figure 10A:
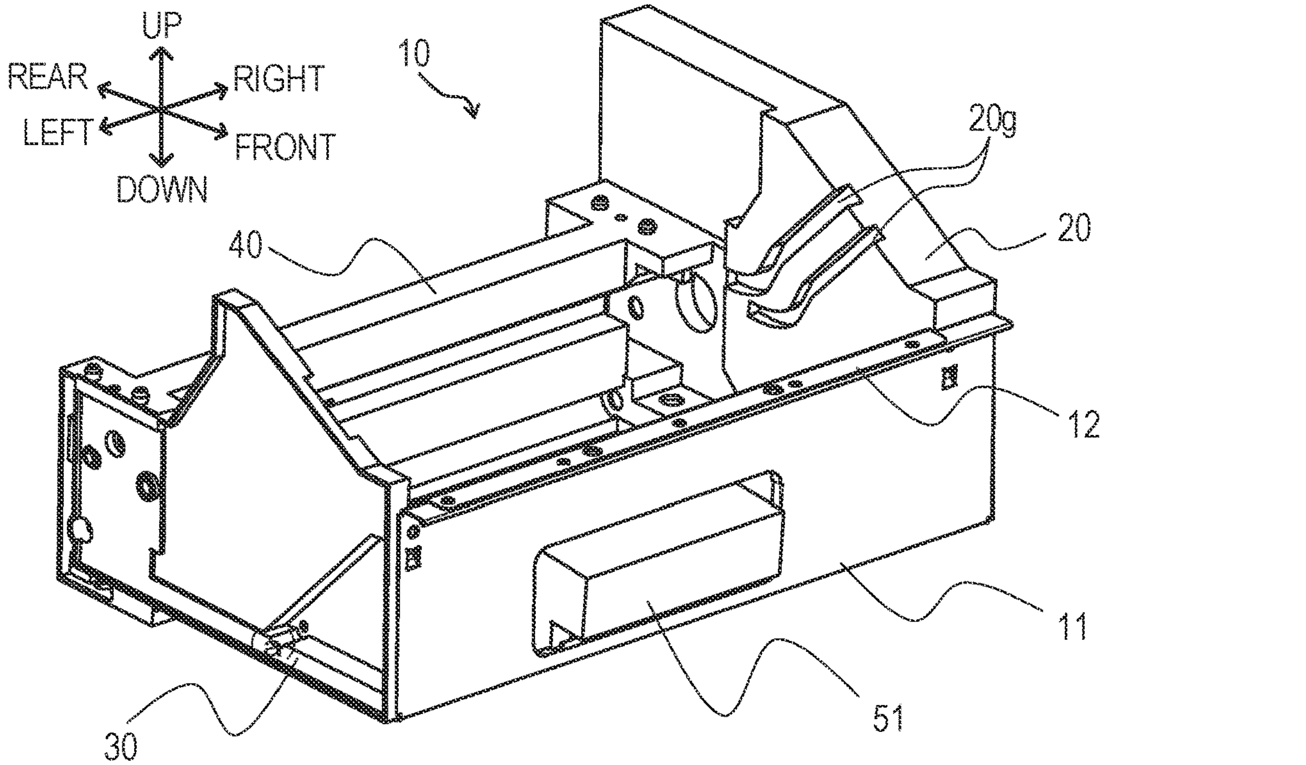
FIG. 10A, FIG. 10B, and FIG. 10C are views for illustrating a configuration of the image forming module in Modification Example 2 of the first embodiment.
Figure 10B:
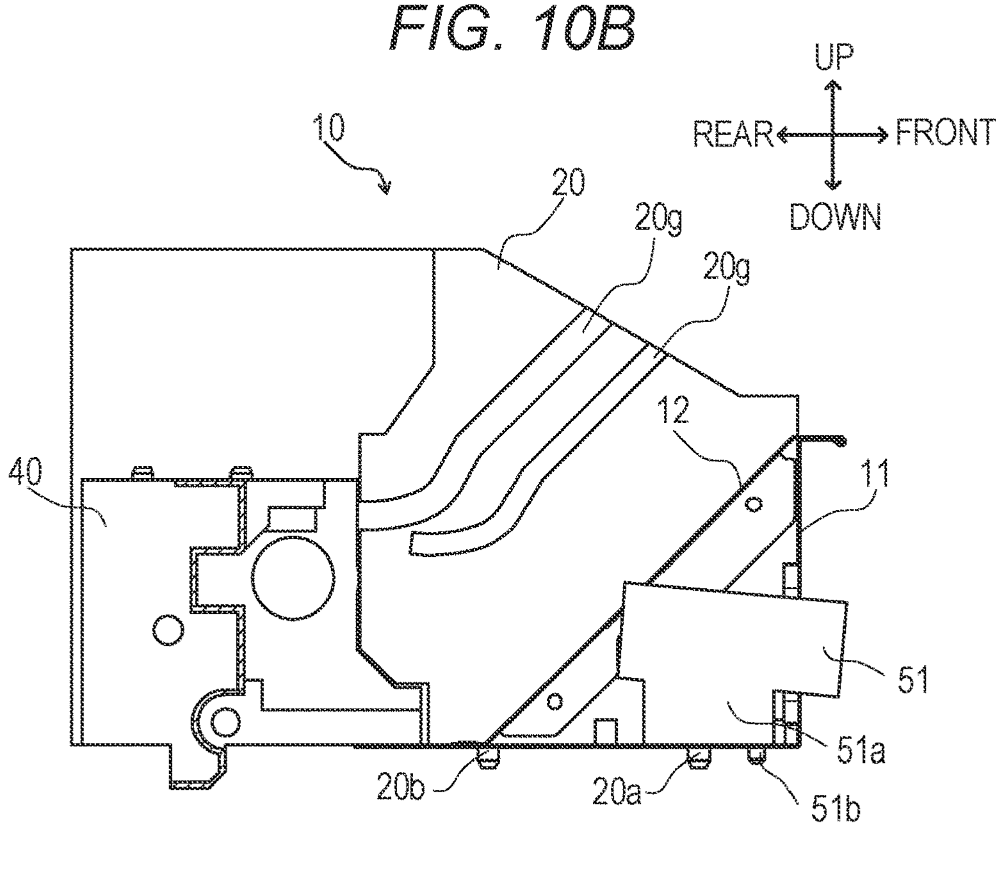
Figure 10C:
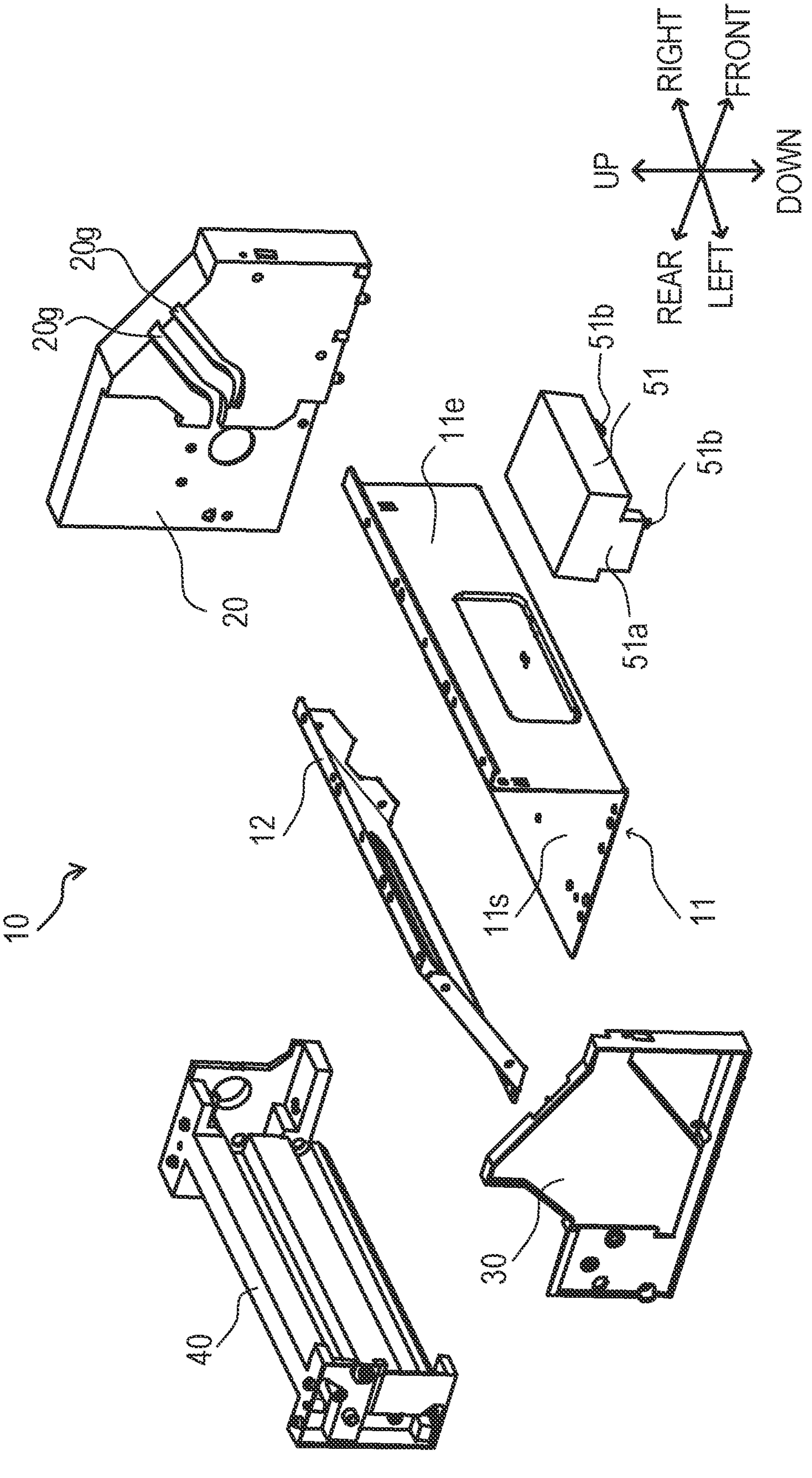

Further, in the first embodiment, the exposure unit 50 is fixed to the first face 11*s* of the scanner frame 11 through intermediation of the two scanner stays 50*a*. However, the present disclosure is not limited thereto. As in Modification Example 2 illustrated in FIG. 10A, FIG. 10B, and FIG. 10C, an exposure unit 51 may be fixed directly to the first face 11*s* of the scanner frame 11. Modification Example 2 is described with reference to FIG. 10A, FIG. 10B, and FIG. 10C. FIG. 10A is a perspective view for illustrating the image forming module 10 in Modification Example 2 of the first embodiment as seen from the upper left side thereof. FIG. 10B is a sectional view for illustrating the image forming module 10 in Modification Example 2. FIG. 10C is an exploded perspective view for illustrating components of the image forming module 10 in Modification Example 2 as seen from the upper left side of the image forming module 10. In Modification Example 2, the exposure unit 51 includes mounting portions 51*a*. Each of the mounting portions 51*a* is a side face portion of a housing of the exposure unit 51 that protrudes vertically downward and is arranged to be opposed to the right side plate 20 or the left side plate 30. Moreover, the mounting portions 51*a* each include a boss 51*b*. Under a state in which the bosses 51*b* are inserted in holes formed in the first face 11*s* of the scanner frame 11, the exposure unit 51 is fixed to the first face 11*s*. Thus, the exposure unit 51 may be positioned with respect to the first face 11*s* and to the scanner frame 11, and may be arranged at a predetermined position.

Figure 11A:
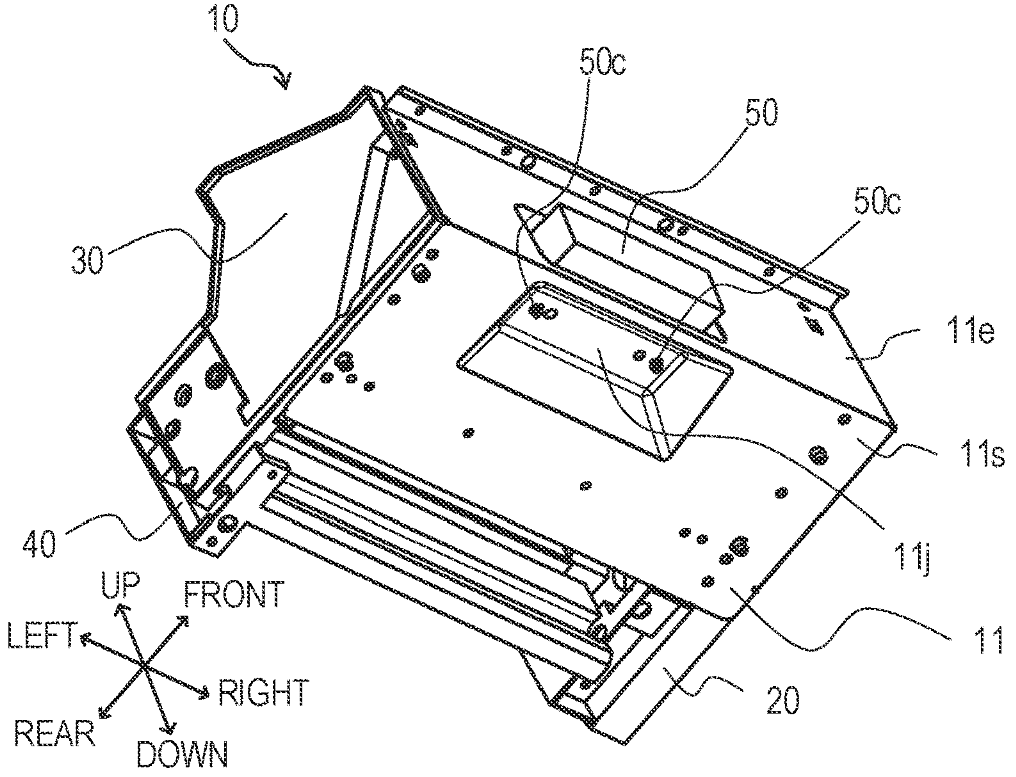
FIG. 11A, FIG. 11B, and FIG. 11C are views for illustrating a configuration of the image forming module in Modification Example 3 of the first embodiment.
Figure 11B:
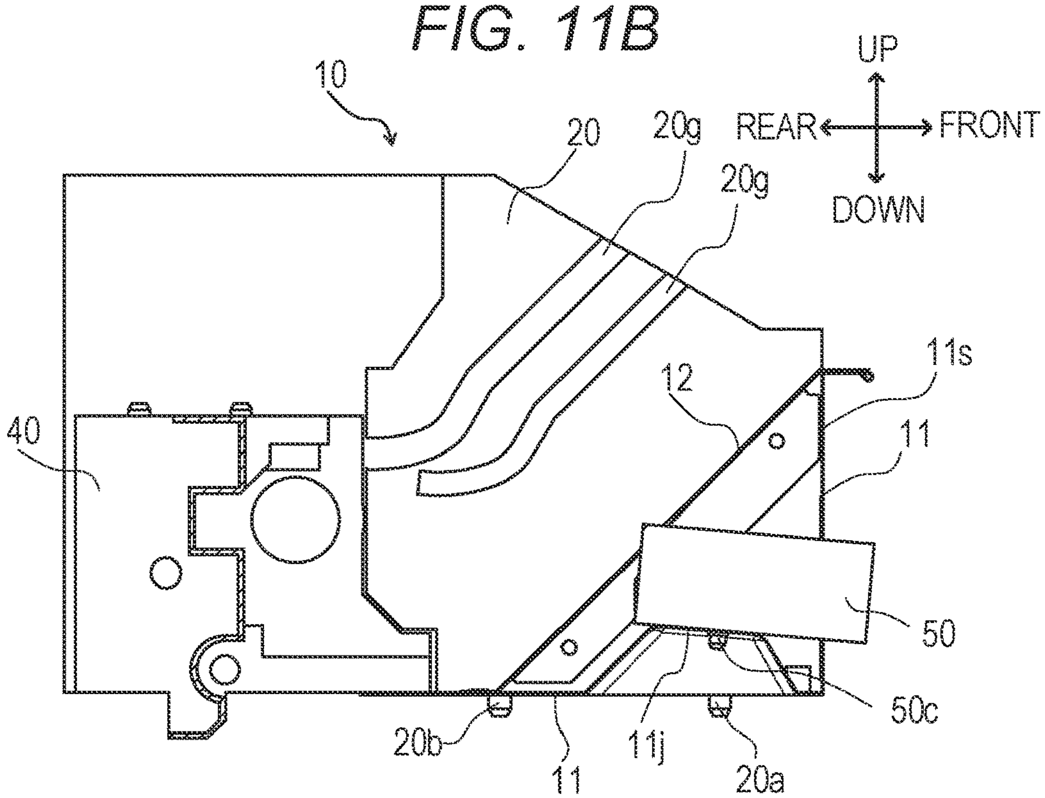
Figure 11C:
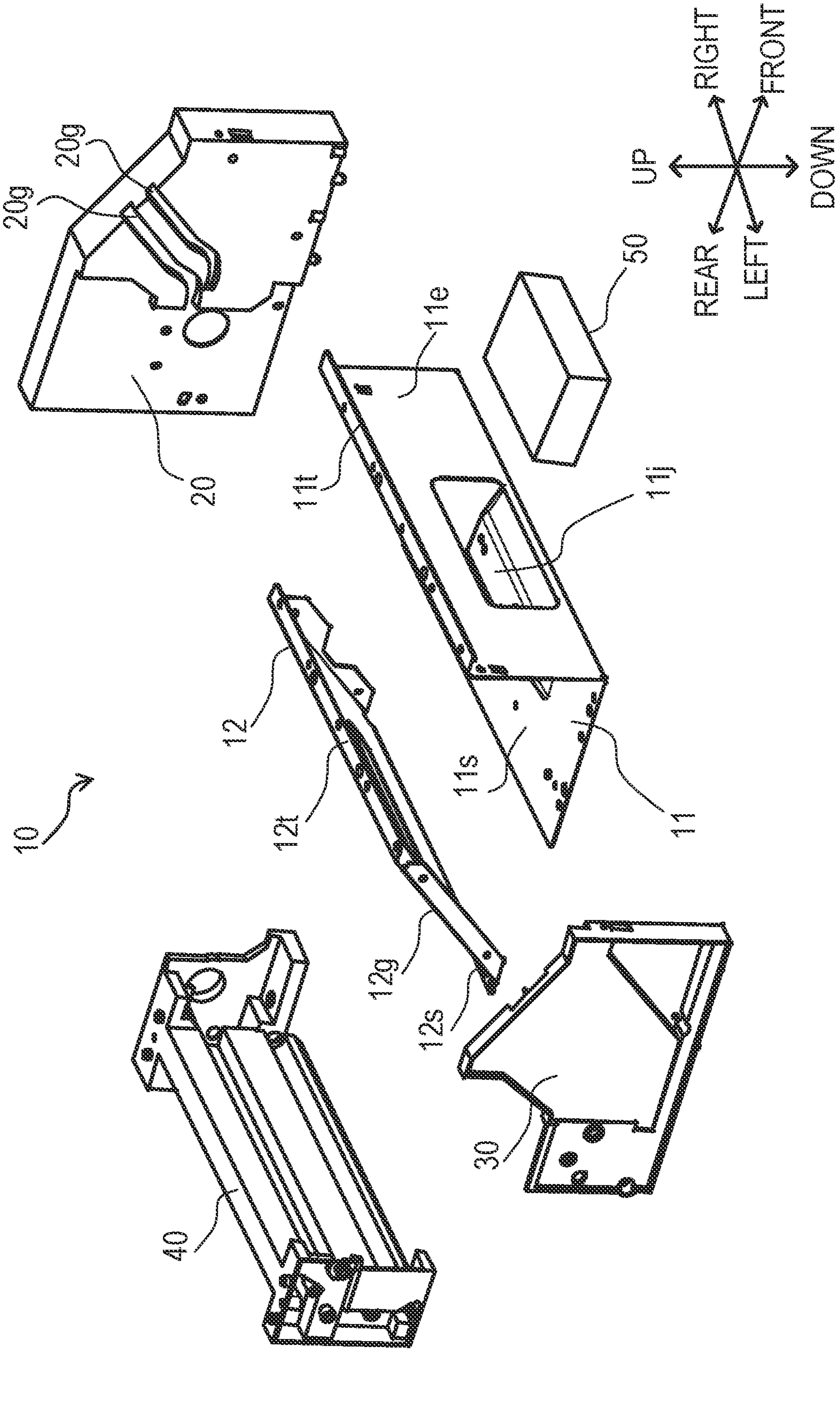
Figure 12:
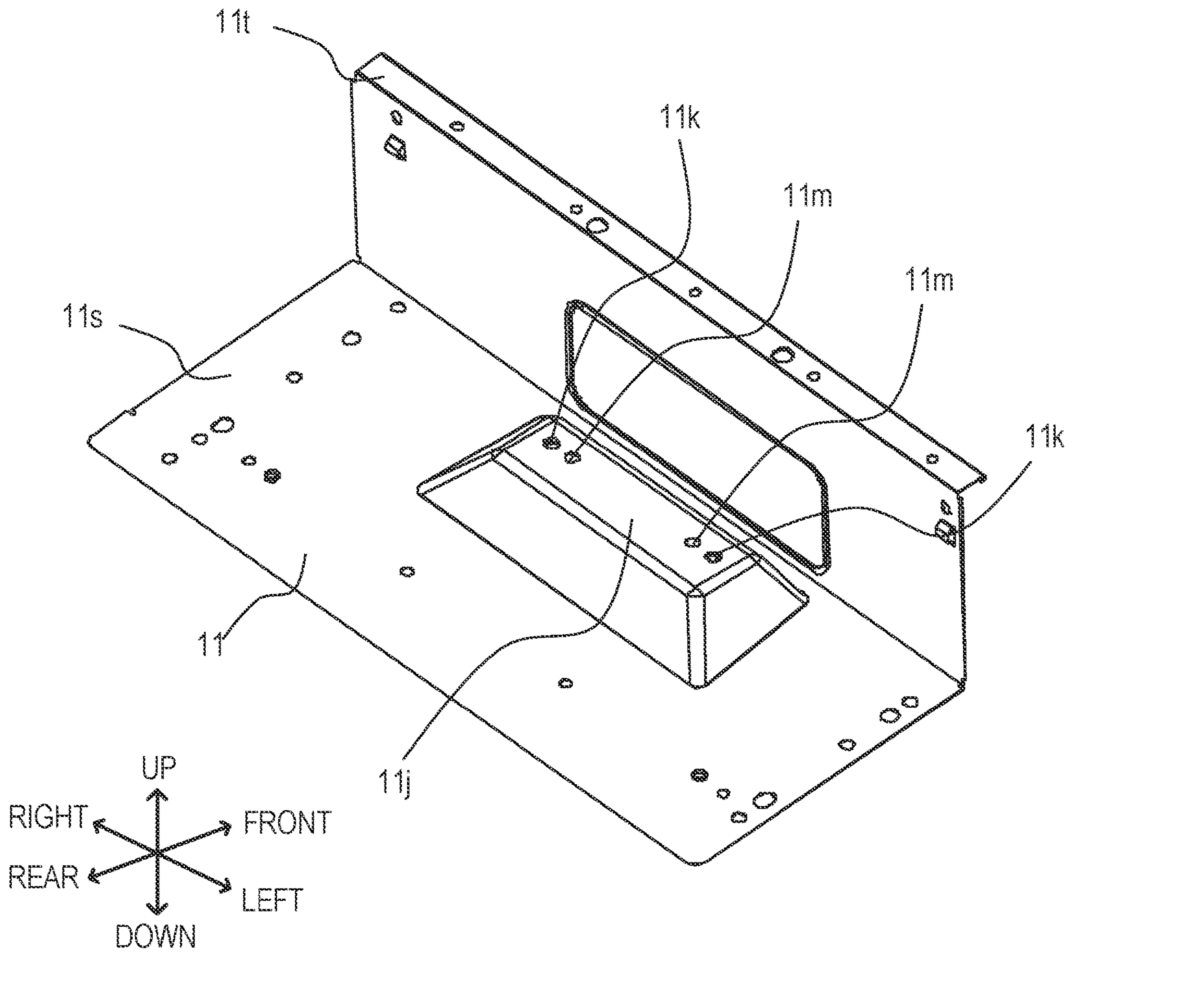
FIG. 12 is a perspective view for illustrating the image forming module in Modification Example 3 of the first embodiment.

Moreover, as in Modification Example 3 illustrated in FIG. 11A, FIG. 11B, FIG. 11C, and FIG. 12, in place of the scanner stays 50*a*, a first face 11*j* to which the exposure unit 50 is to be fixed may be formed in the first face 11*s* of the scanner frame 11. Modification Example 3 is described with reference to FIG. 11A, FIG. 11B, and FIG. 11C. FIG. 11A is a perspective view for illustrating the image forming module 10 in Modification Example 3 of the first embodiment as seen from the lower left side thereof. FIG. 11B is a sectional view for illustrating the image forming module 10 in Modification Example 3. FIG. 11C is an exploded perspective view for illustrating components of the image forming module 10 in Modification Example 3 as seen from the upper left side of the image forming module 10. FIG. 12 is a perspective view for illustrating a shape of the scanner frame 11. In Modification Example 3, in the first face 11*s* of the scanner frame 11, the first face 11*j* is formed in such a manner as to protrude within a space surrounded by the scanner frame 11 and the scanner reinforcement plate 12, that is, protrude vertically upward. Further, bosses 50*c* of the exposure unit 50 are inserted into holes 11*k* formed in the first face 11*j* of the scanner frame 11. Screws (not shown) are fitted to the exposure unit 50 through holes 11*m* formed in the first face 11*j* of the scanner frame 11, and the exposure unit 50 is fixed (screw-fastened) to the first face 11*j*. Thus, the exposure unit 50 may be positioned with respect to the first face 11*j* and to the scanner frame 11, and may be arranged at a predetermined position.

Figure 13A:
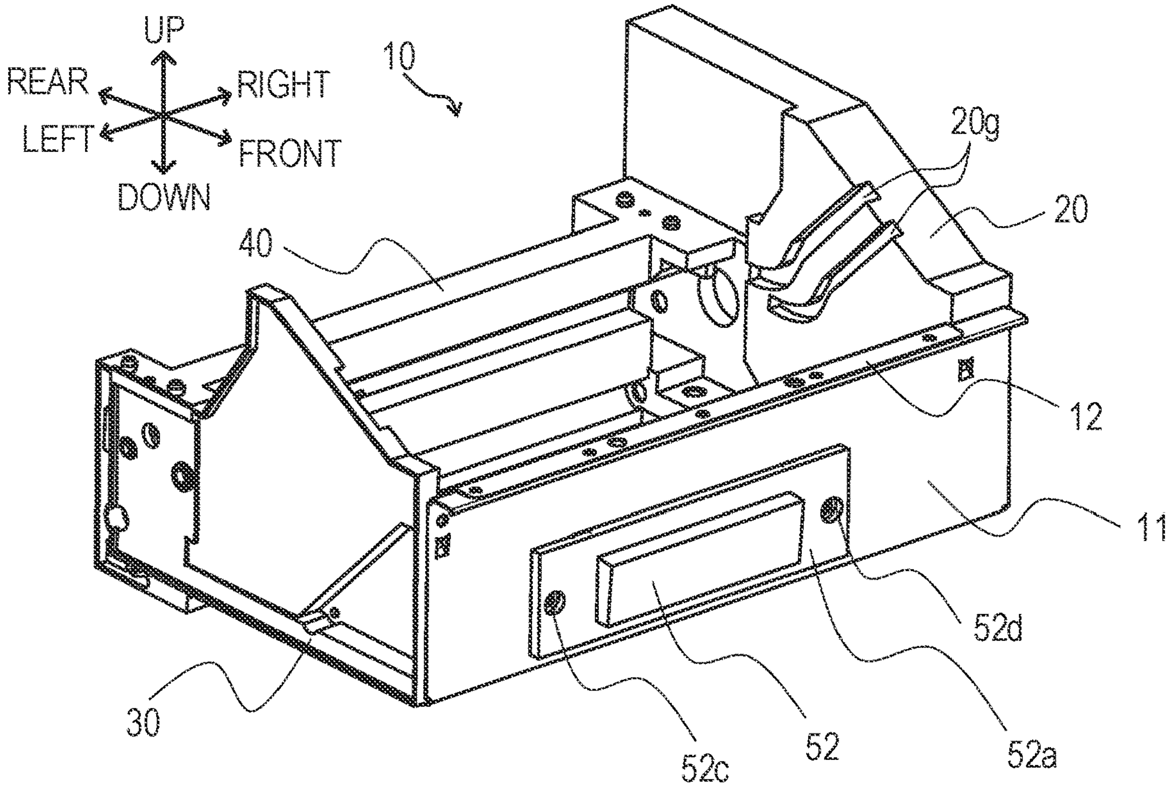
FIG. 13A, FIG. 13B, and FIG. 13C are perspective views for illustrating a configuration of the image forming module in Modification Example 4 of the first embodiment.
Figure 13B:
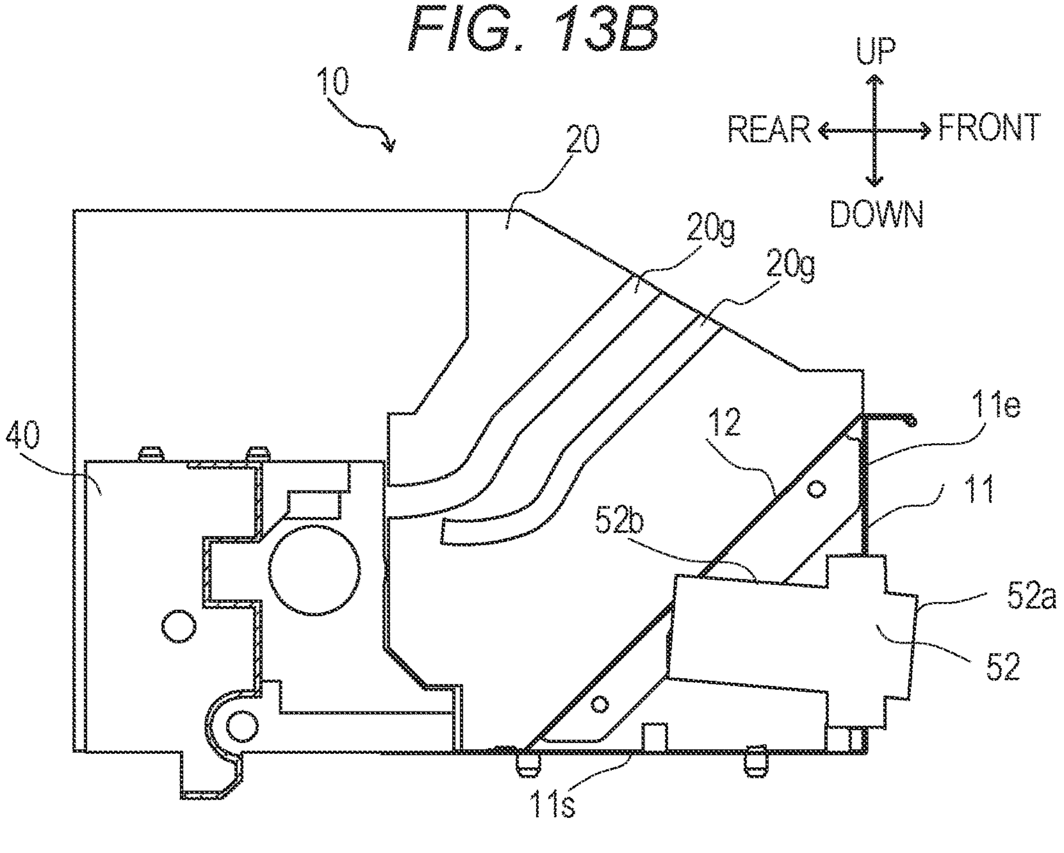
Figure 13C:
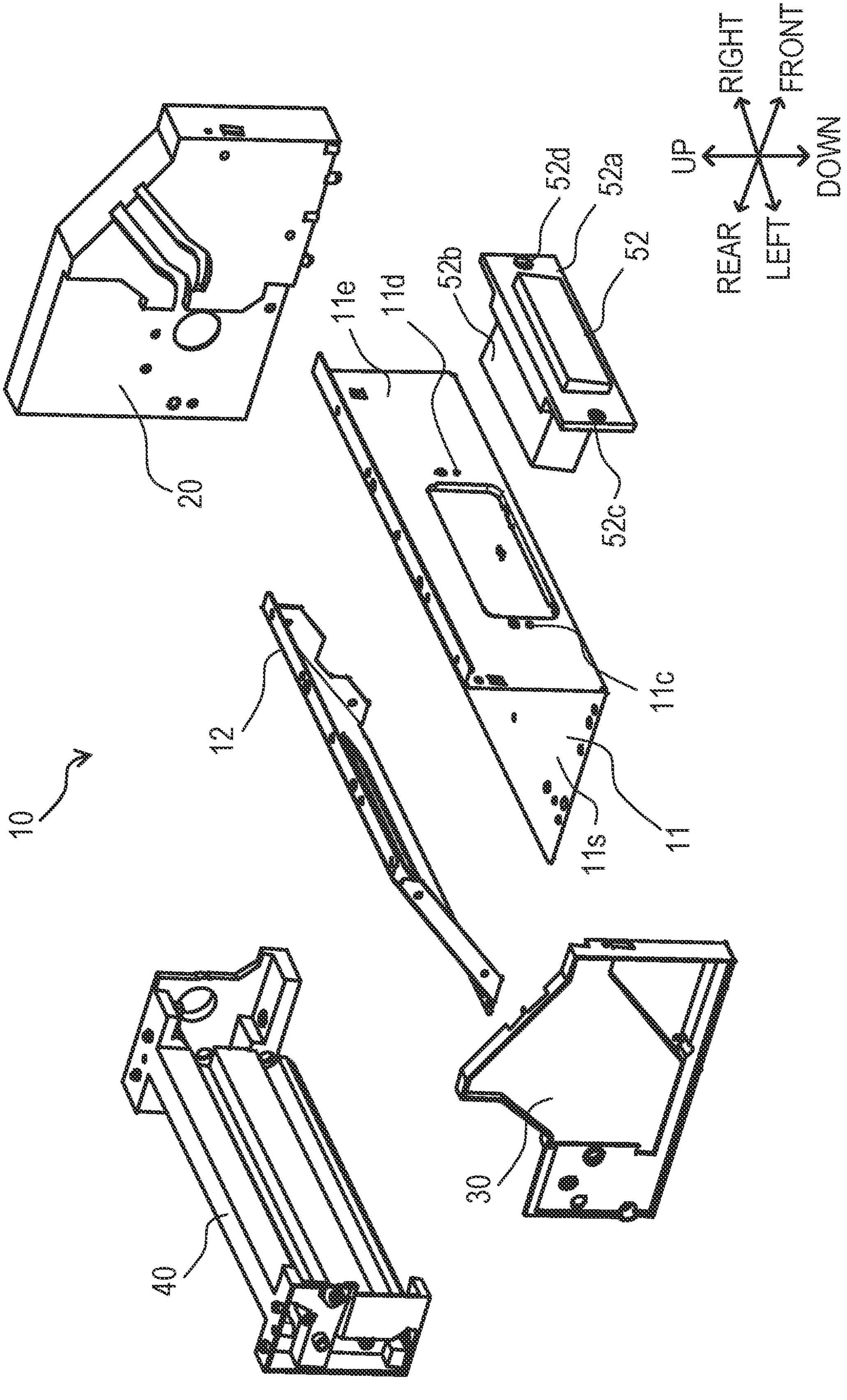

Moreover, in the first embodiment, the exposure unit 50 is installed on the first face 11*s* of the scanner frame 11 through intermediation of the scanner stays 50*a*, but the present disclosure is not limited thereto. For example, as in Modification Example 4 illustrated in FIG. 13A, FIG. 13B, and FIG. 13C, an exposure unit 52 may be fixed to the second face 11*e* of the scanner frame 11. Modification Example 4 is described with reference to FIG. 13A, FIG. 13B, and FIG. 13C. FIG. 13A is a perspective view for illustrating the image forming module 10 in Modification Example 4 of the first embodiment as seen from the upper left side thereof. FIG. 13B is a sectional view for illustrating the image forming module 10 in Modification Example 4. FIG. 13C is an exploded perspective view for illustrating components of the image forming module 10 in Modification Example 4 as seen from the upper left side of the image forming module 10.

In Modification Example 4, the exposure unit 52 is installed and fixed to the second face 11*e* that is arranged in the apparatus front surface of the scanner frame 11. As illustrated in FIG. 13C, the exposure unit 52 includes an exposure portion 52*b* and a fixing portion 52*a*. The exposure portion 52*b* is configured to radiate the laser beam corresponding to image information. The fixing portion 52*a* is configured to install and fix the exposure portion 52*b* to the second face 11*e* of the scanner frame 11. The fixing portion 52*a* has fitting holes 52*c* and 52*d* through which the fixing portion 52*a* is fastened to the second face 11*e*. In Modification Example 4, screws are fitted into the fitting holes 52*c* and 52*d* of the exposure unit 52 through fitting holes 11*c* and 11*d* formed in the second face 11*e* of the scanner frame 11. Thus, the exposure unit 52 may be fixed (screw-fastened) to the second face 11*e* of the scanner frame 11.

Figure 14:
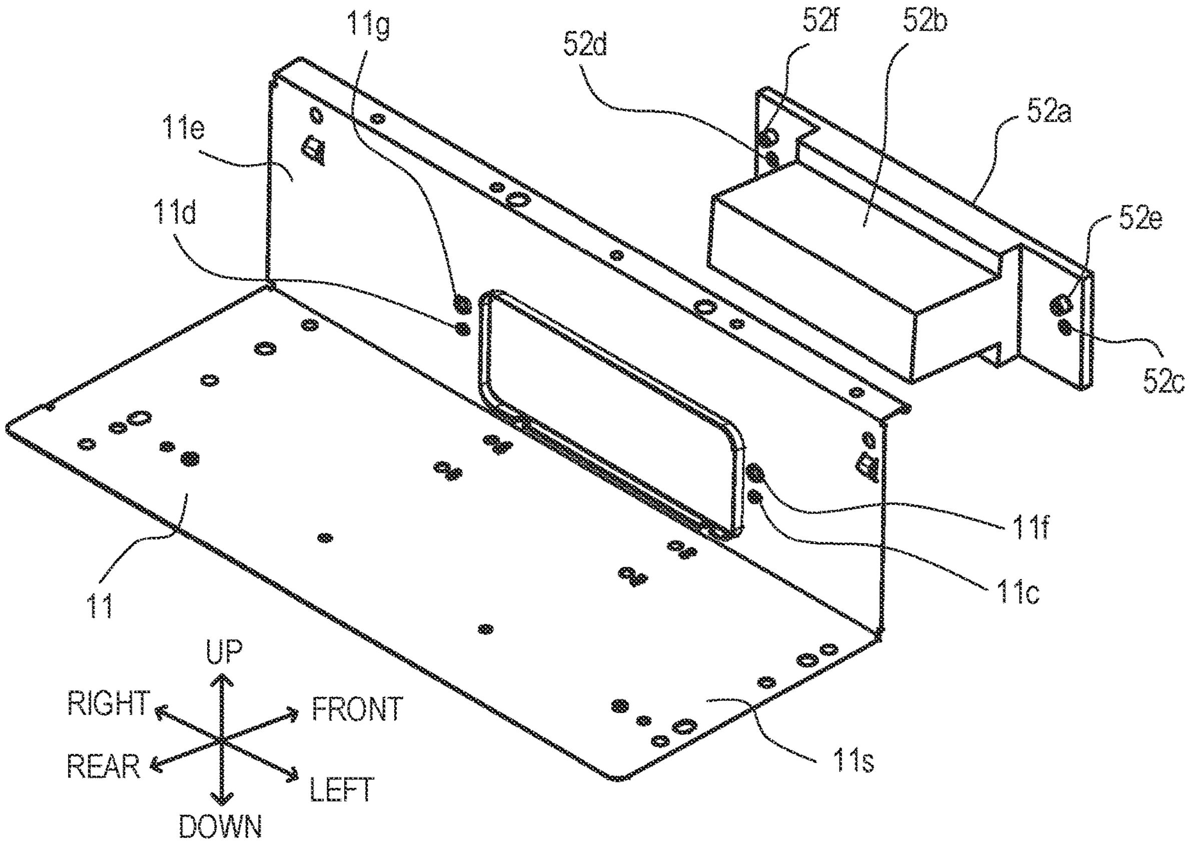
FIG. 14 is a perspective view for illustrating the image forming module in one mode of Modification Example 4 of the first embodiment.

In Modification Example 4, as illustrated in FIG. 14, in order to more stably fix the exposure unit 52 to the scanner frame 11, bosses 52*e* and 52*f* may be formed on a surface of the fixing portion 52*a* of the exposure unit 52 that is arranged to be opposed to the second face 11*e* of the scanner frame 11. The bosses 52*e* and 52*f* are formed above the fitting holes 52*c* and 52*d*, but may be formed near the fitting holes 52*c* and 52*d*. In this case, the bosses 52*e* and 52*f* formed on the fixing portion 52*a* of the exposure unit 52 are inserted into boss holes 11*f* and 11*g* formed in the second face 11*e* of the scanner frame 11, and thus the exposure unit 52 is positioned with respect to the scanner frame 11. Under this state, screws are fitted into the fitting holes 52*c* and 52*d* of the exposure unit 52 through the fitting holes 11*c* and 11*d* formed in the second face 11*e* of the scanner frame 11. In this manner, the exposure unit 52 is fixed (screw-fastened) to the second face 11*e* of the scanner frame 11. Thus, positioning accuracy at the time of mounting the exposure unit 52 to the scanner frame 11 can be increased.

Figure 15A:
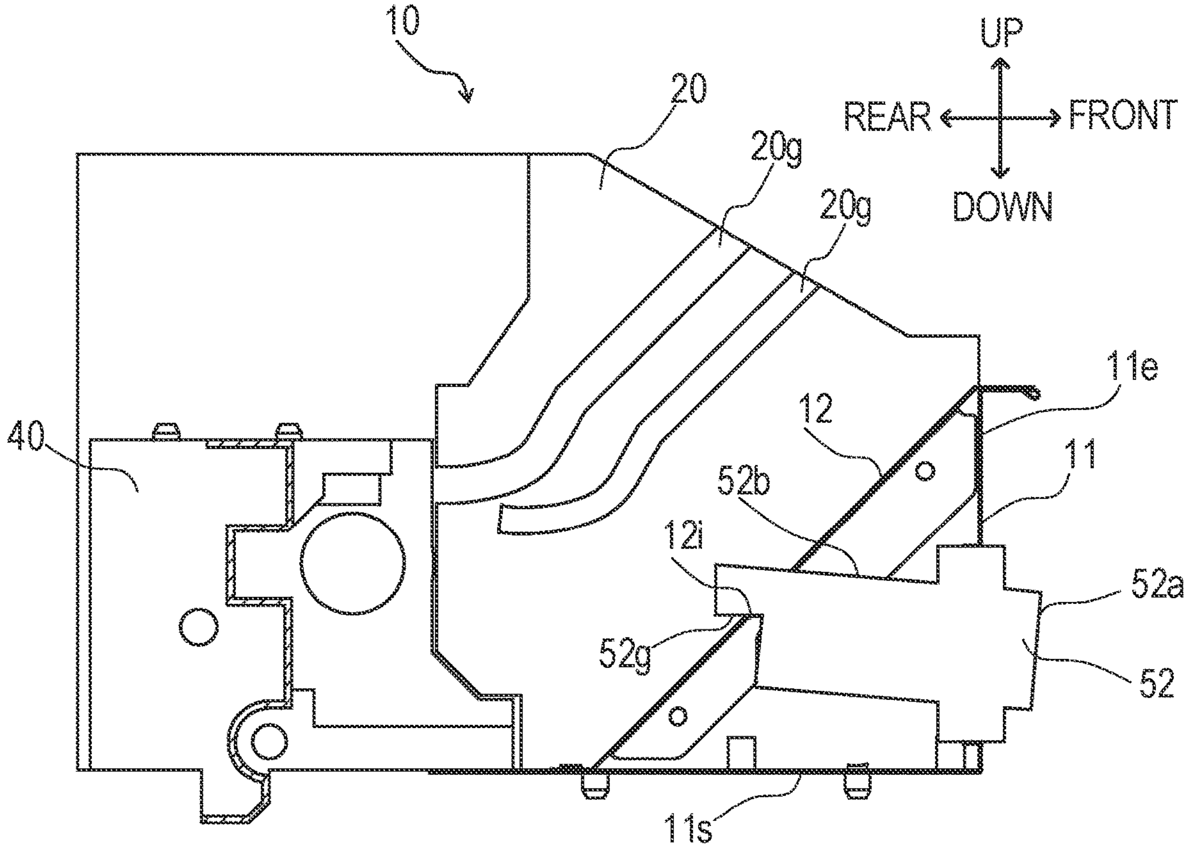
FIG. 15A, FIG. 15B, and FIG. 15C are views for illustrating a configuration of the image forming module in one mode of Modification Example 4 of the first embodiment.
Figure 15B:
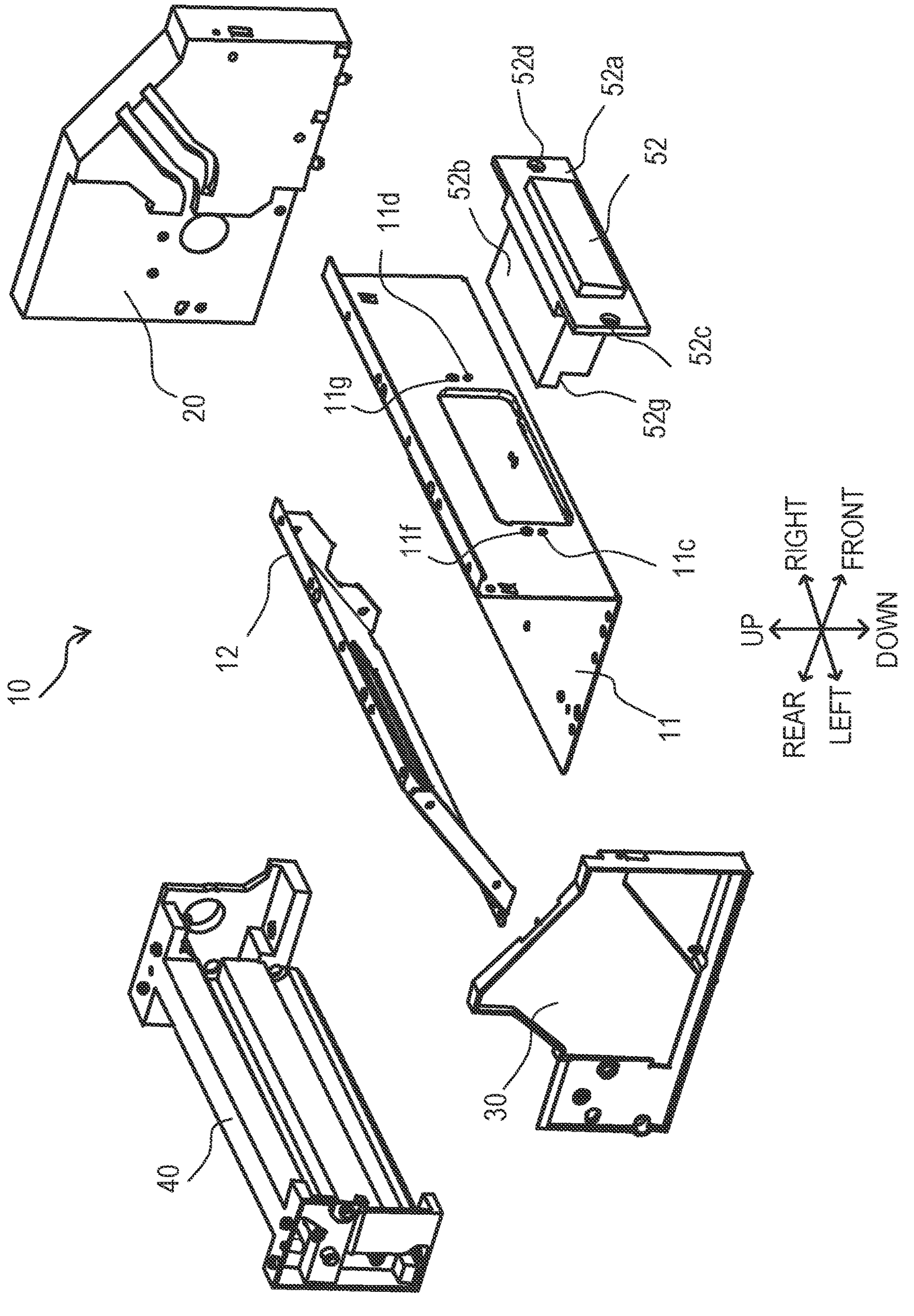
Figure 15C:
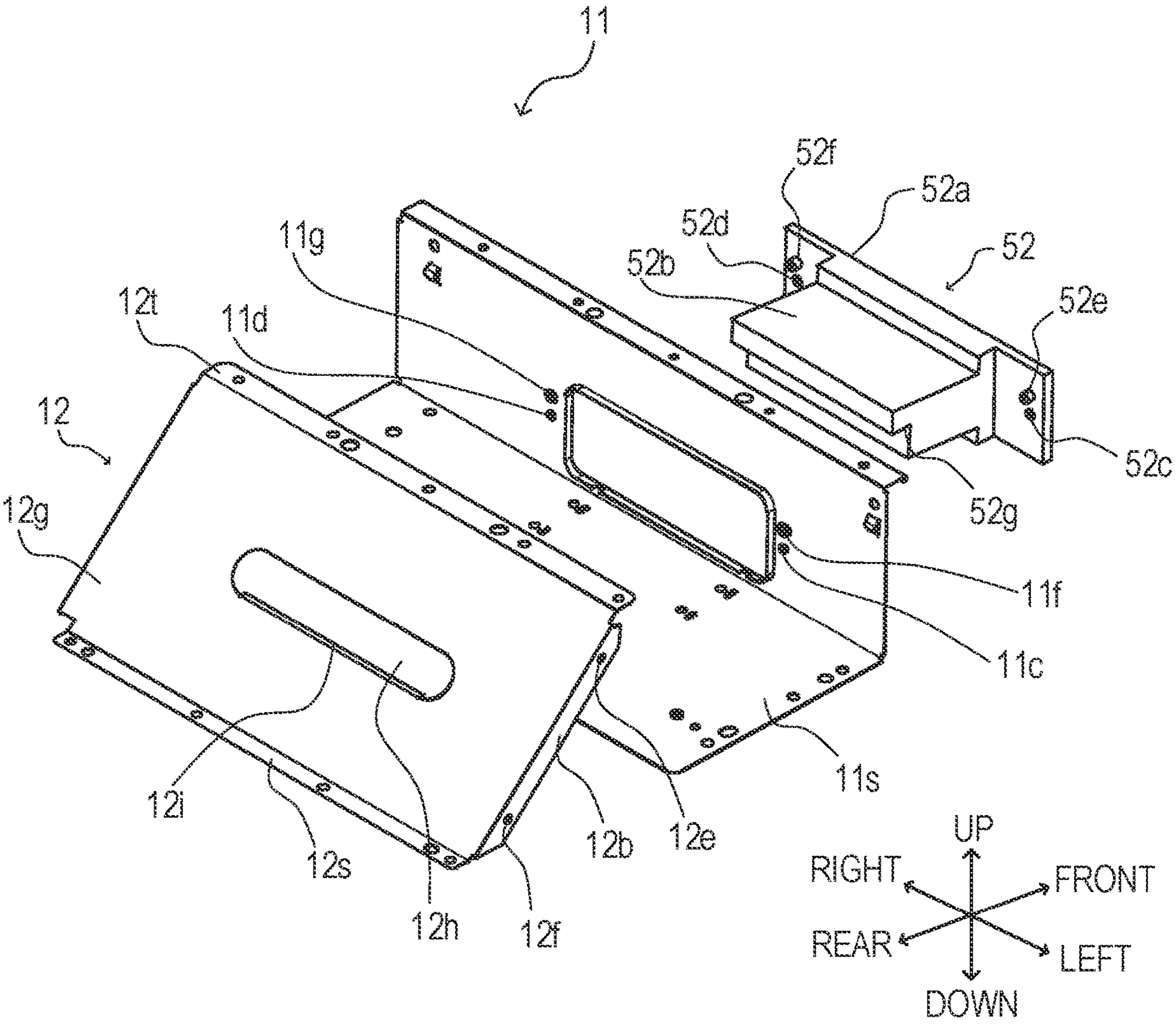

Moreover, in Modification Example 4, as illustrated in FIG. 15A, FIG. 15B, and FIG. 15C, in order to further stably install the exposure unit 52, a distal end portion of the exposure unit 52, from which the laser beam is emitted, may be supported by the scanner reinforcement plate 12. FIG. 15A is a sectional view for illustrating the image forming module 10 in Modification Example 4 of the first embodiment. FIG. 15B is an exploded perspective view for illustrating components of the image forming module 10 in Modification Example 4 as seen from the upper left side of the image forming module 10. FIG. 15C is a perspective view for illustrating shapes of the scanner frame 11, the scanner reinforcement plate 12, and the exposure unit 52. In this configuration, one end of the exposure unit 52, which has an emission port from which the laser beam is emitted to the photosensitive drum 101, is inserted in the opening portion 12*h* of the scanner reinforcement plate 12, and a bottom surface 52*g* of the one end of the exposure unit 52 is supported by a lower end 12*i* of the opening portion 12*h*. Thus, at the one end of the exposure unit 52, a load of the exposure unit 52 is borne by the lower end 12*i* of the opening portion 12*h*, thereby being capable of setting a position of the exposure unit 52 in an up-and-down direction (vertical direction) to a predetermined position. As a result, positioning accuracy at the time of mounting the exposure unit 52 to the scanner frame 11 can be increased. As illustrated in FIG. 15A, FIG. 15B, and FIG. 15C, the one end of the exposure unit 52 may be partially thinned in the up-and-down direction (vertical direction) so that the one end of the exposure unit 52 can be inserted in the opening portion 12*h* without an increase in width of the opening portion 12*h* of the scanner reinforcement plate 12. In the configuration illustrated in FIG. 15A, FIG. 15B, and FIG. 15C, a lower portion of the one end of the exposure unit 52 is cut out, but the present disclosure is not limited thereto. It is only required that the one end of the exposure unit 52 having the emission port can be inserted in the opening portion 12*h*, and an upper portion of the one end of the exposure unit 52 may be cut out.

Second Embodiment

In the first embodiment, description is made of the configuration in which the scanner frame and the scanner reinforcement plate are formed of separate components. However, the present disclosure is not limited thereto. In a second embodiment, description is made of a configuration in which the scanner frame and the scanner reinforcement plate are formed of an integrated component.

[Configuration of Image Forming Module]

Figure 16A:
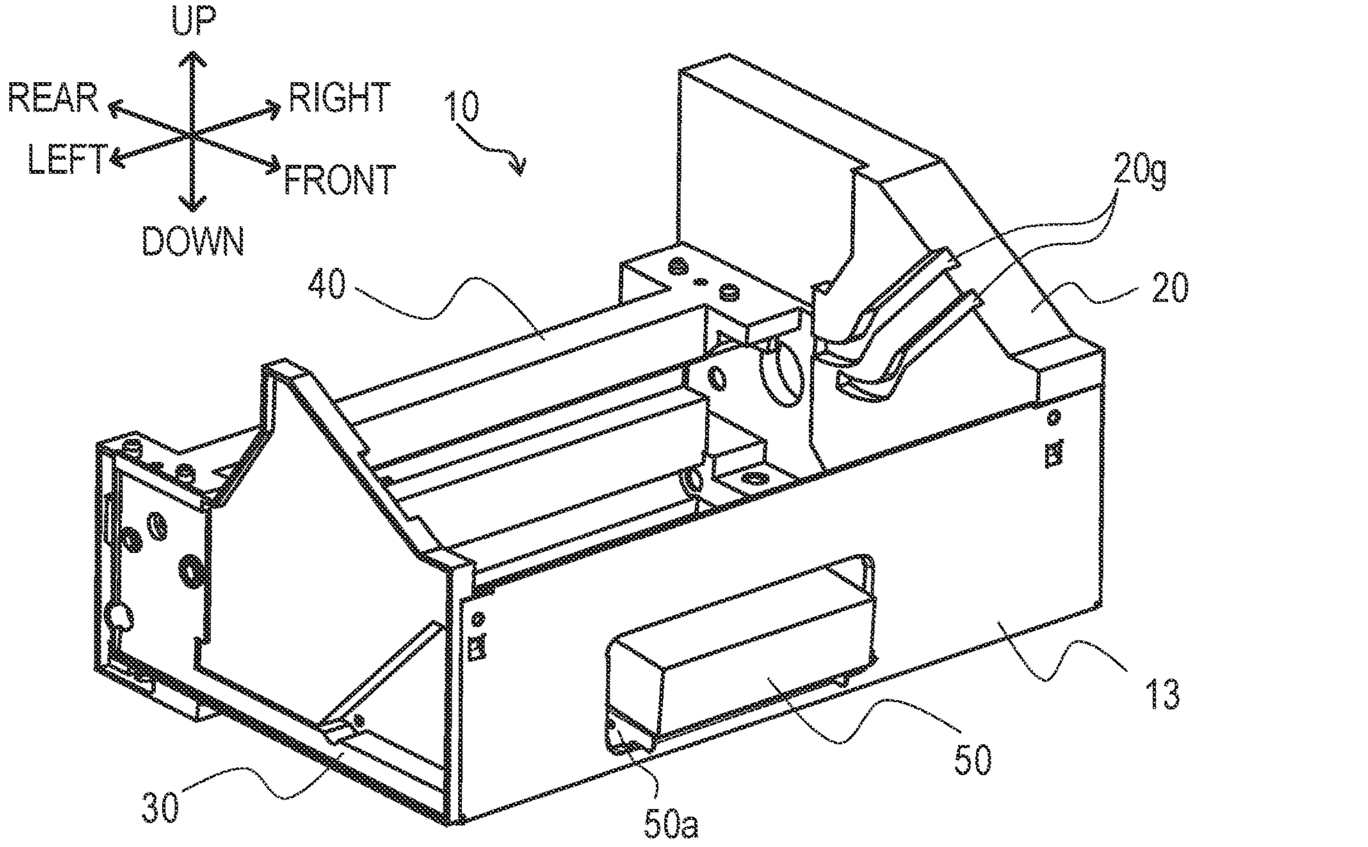
FIG. 16A, FIG. 16B, and FIG. 16C are perspective views for illustrating a configuration of the image forming module in a second embodiment.
Figure 16B:
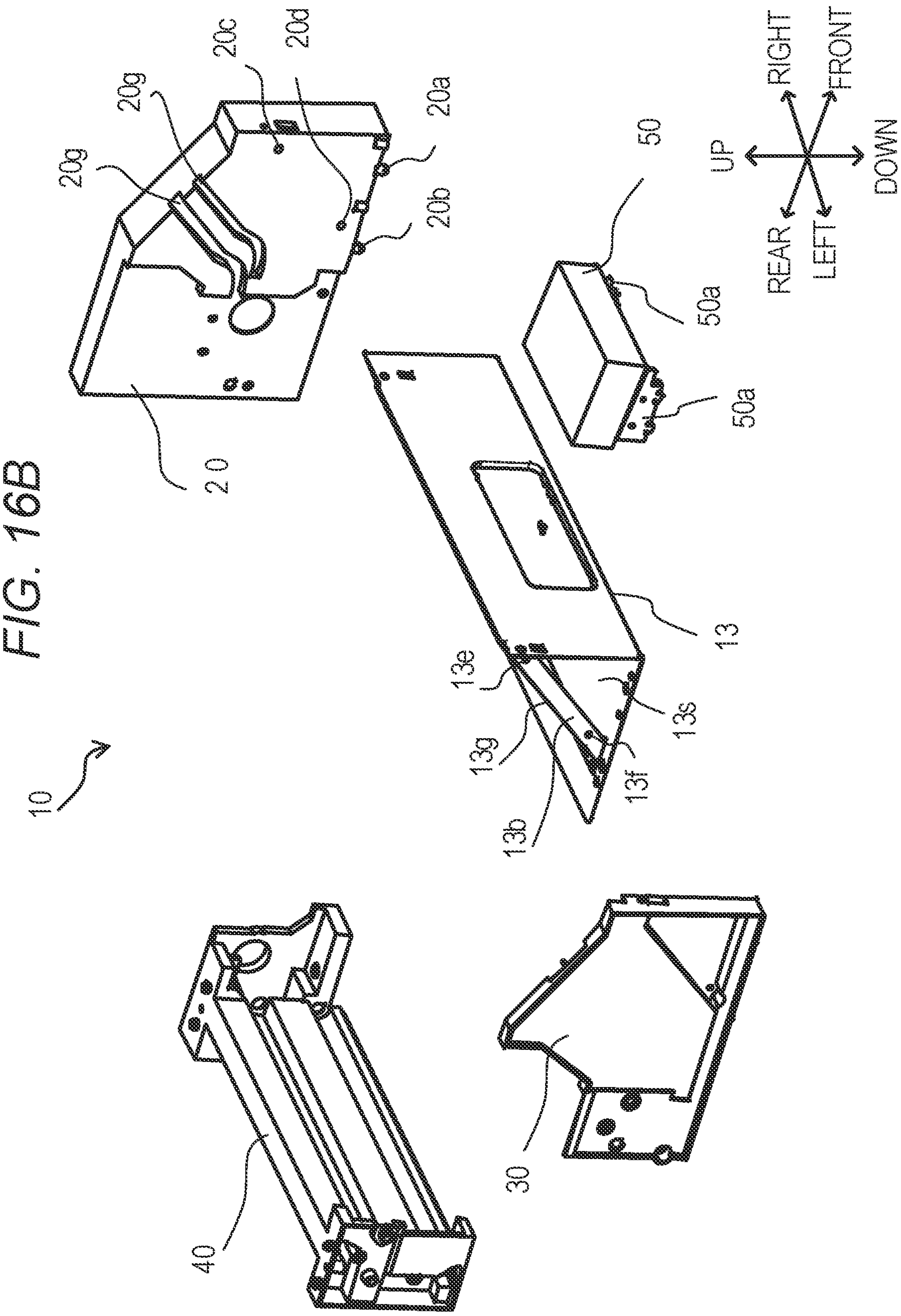
Figure 16C:
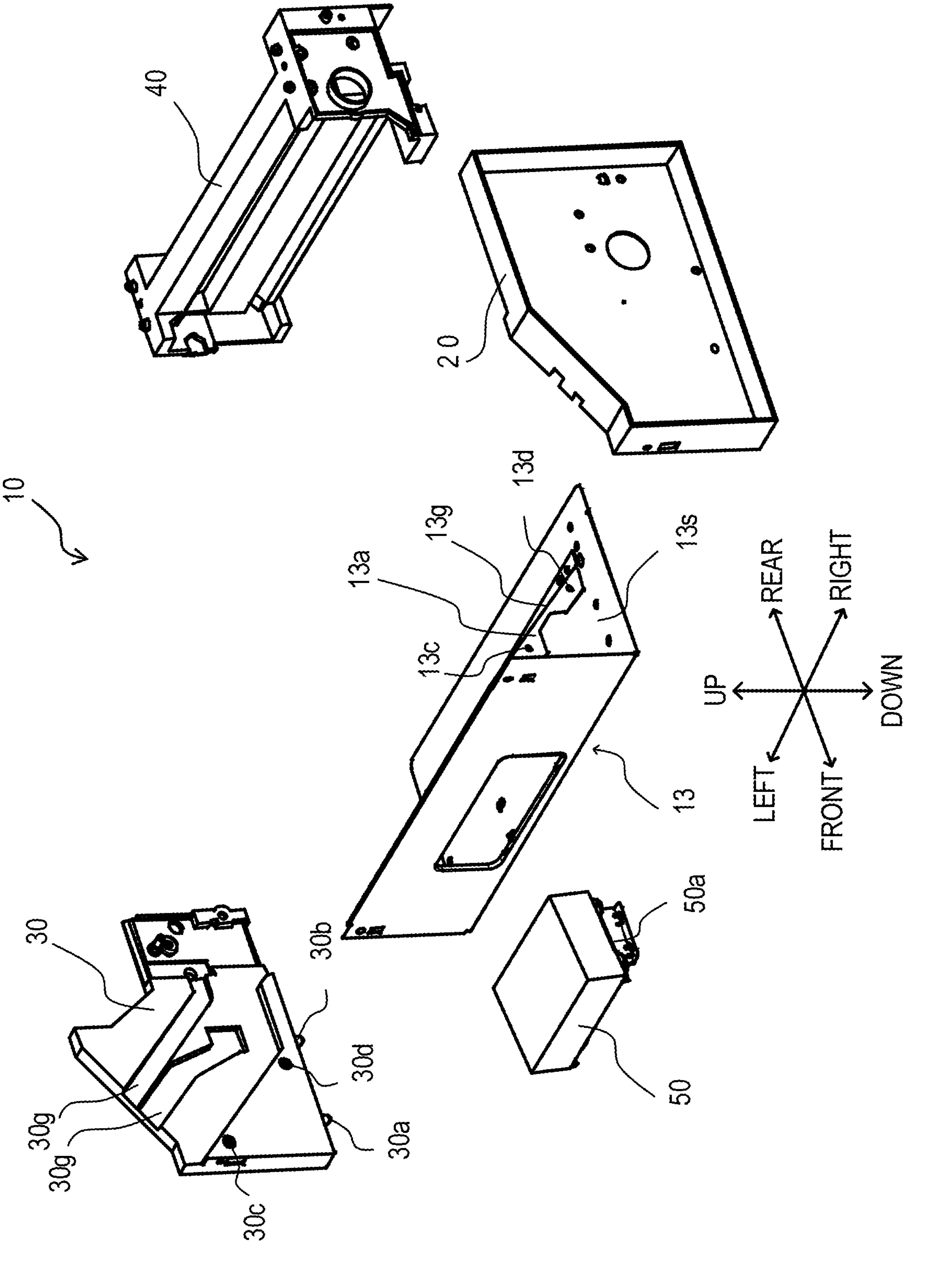

The second embodiment is described with reference to FIG. 16A, FIG. 16B, and FIG. 16C. FIG. 16A is a perspective view for illustrating the image forming module 10 in the second embodiment as seen from the upper left side thereof. FIG. 16B is an exploded perspective view for illustrating components of the image forming module 10 in the second embodiment as seen from the upper left side of the image forming module 10. FIG. 16C is an exploded perspective view for illustrating the components of the image forming module 10 in the second embodiment as seen from the upper right side of the image forming module 10. The configuration of the image forming module 10 illustrated in FIG. 16A, FIG. 16B, and FIG. 16C is the same as the configuration of the image forming module 10 in the first embodiment illustrated in FIG. 4A, FIG. 4B, and FIG. 4C except for a scanner frame 13 to be described later. The same components are denoted by the same reference symbols, and hence description thereof is omitted.

In the second embodiment, the scanner frame 11 and the scanner reinforcement plate 12, which are formed of separate components in the first embodiment, are modified into the scanner frame 13 that is a single integrated component. That is, similarly to the scanner frame 11 in the first embodiment, the scanner frame 13 includes a first face 13*s* and an inclined face portion 13*g*. On the first face 13*s*, the exposure unit 50, the right side plate 20, the left side plate 30, and the transfer frame 40 are installed. The inclined face portion 13*g* extends in the direction of inserting and removing the cartridge 102. Moreover, similarly to the scanner reinforcement plate 12 in the first embodiment, the scanner frame 13 includes a right side face portion 13*a* and a left side face portion 13*b*. The right side face portion 13*a* has fitting holes 13*c* and 13*d* through which the right side plate 20 is fixed to the right side face portion 13*a*. The left side face portion 13*b* has fitting holes 13*e* and 13*f* through which the left side plate 30 is fixed to the left side face portion 13*b*. The scanner frame 13 is a component obtained by integrating the scanner frame 11 and the scanner reinforcement plate 12 with each other, and hence does not include the support portion 11*t* and the first fixing portion 12*t* (FIG. 5) that are formed in the scanner frame 11 and the scanner reinforcement plate 12, respectively.

In the second embodiment, as illustrated in FIG. 16B and FIG. 16C, similarly to the first embodiment, the right side plate 20 is superposed vertically above the first face 13*s* of the scanner frame 13, and the bosses 20*a* and 20*b* of the right side plate 20 are respectively inserted into boss holes formed in the first face 13*s*. In this manner, the right side plate 20 is positioned with respect to the scanner frame 13. Under this state, screws (not shown) are fitted into the fitting holes 13*c* and 13*d* formed in the right side face portion 13*a* of the scanner frame 13 through the fitting holes 20*c* and 20*d* formed in the right side plate 20. In this manner, the right side plate 20 is fixed (screw-fastened) to the scanner frame 13. Similarly, the left side plate 30 is superposed vertically above the first face 13*s* of the scanner frame 13, and the bosses 30*a* and 30*b* are respectively inserted into boss holes formed in the first face 13*s*, thereby positioning the left side plate 30 with respect to the scanner frame 13. Under this state, screws (not shown) are fitted into the fitting holes 13*e* and 13*f* formed in the left side face portion 13*b* of the scanner frame 13 through the fitting holes 30*c* and 30*d* formed in the left side plate 30. In this manner, the left side plate 30 is fixed (screw-fastened) to the scanner frame 13. As described above, the right side plate 20 and the left side plate 30 are respectively fastened to the right side face portion 13*a* and the left side face portion 13*b* of the scanner frame 13 in place of the scanner reinforcement plate 12 in the first embodiment. Only this point is different from the configuration in the first embodiment.

That is, in a method of mounting the right side plate 20 and the left side plate 30 to the scanner frame 13 in the second embodiment, only a way of fastening the right side plate 20 and the left side plate 30 from a right-and-left direction is different from that in the first embodiment. Therefore, similarly to the first embodiment, the bosses 20*a* and 20*b* of the right side plate 20 are respectively inserted into the boss holes formed in the first face 13*s*. Under a state in which the right side plate 20 is thus positioned with respect to the scanner frame 13, a screw (not shown) is fitted into a fitting hole (not shown) of the right side plate 20 through a fitting hole formed in the first face 13*s*. Moreover, the bosses 30*a* and 30*b* are respectively inserted into the boss holes formed in the first face 13*s*. Under a state in which the left side plate 30 is thus positioned with respect to the scanner frame 13, a screw (not shown) is fitted into a fitting hole (not shown) of the left side plate 30 through a fitting hole formed in the first face 13*s*. In this manner, similarly to the first embodiment, the right side plate 20 and the left side plate 30 can be fixed (screw-fastened) to the scanner frame 13.

As described above, the right side plate 20, the left side plate 30, the transfer frame 40, and the exposure unit 50 are installed from vertically above so as to be placed on the first face 13*s*. Therefore, the components of the image forming module 10 can be positioned in the height direction (vertical direction) of the main body of the image forming module 10 with the first face 13*s*, on which the components are to be installed, being used as a reference plane. Thus, misalignment of the components can be minimized. Further, in the second embodiment, the right side plate 20, the left side plate 30, the transfer frame 40, and the exposure unit 50 are installed on the scanner frame 13 that is a single component forming the reference plane of the image forming module 10. With this configuration, misalignment of the components can be minimized, and the components can be assembled together with the image forming module 10 including the scanner frame 13 and the exposure unit 50 being used as a reference. As a result, misalignment of the laser beam irradiation position on the photosensitive drum 101 irradiated with the laser beam emitted from the exposure unit 50 can be minimized, thereby being capable of realizing the image forming apparatus having high printing accuracy. Moreover, the inclined face portion 13*g*, which corresponds to the scanner reinforcement plate 12 in the first embodiment, is combined with the scanner frame 13 that retains the exposure unit 50. Accordingly, the scanner frame 13 has a sturdy configuration so as to be less liable to deform due to an external force. When the right side plate 20, the left side plate 30, and the transfer frame 40 are fixed to the scanner frame 13 attaining the sturdy configuration owing to combination with the inclined face portion 13*g*, only a portion that causes a defect in image formation due to deformation can be reinforced. Thus, misalignment of the laser beam irradiation position irradiated with the laser beam emitted from the exposure unit 50, which is caused by distortion or strain of the frame, can be minimized, thereby being capable of realizing the image forming apparatus having high printing accuracy.

As described above, according to the second embodiment, occurrence of the misalignment in the image forming module can be prevented, and rigidity can be secured.

Figure 17A:
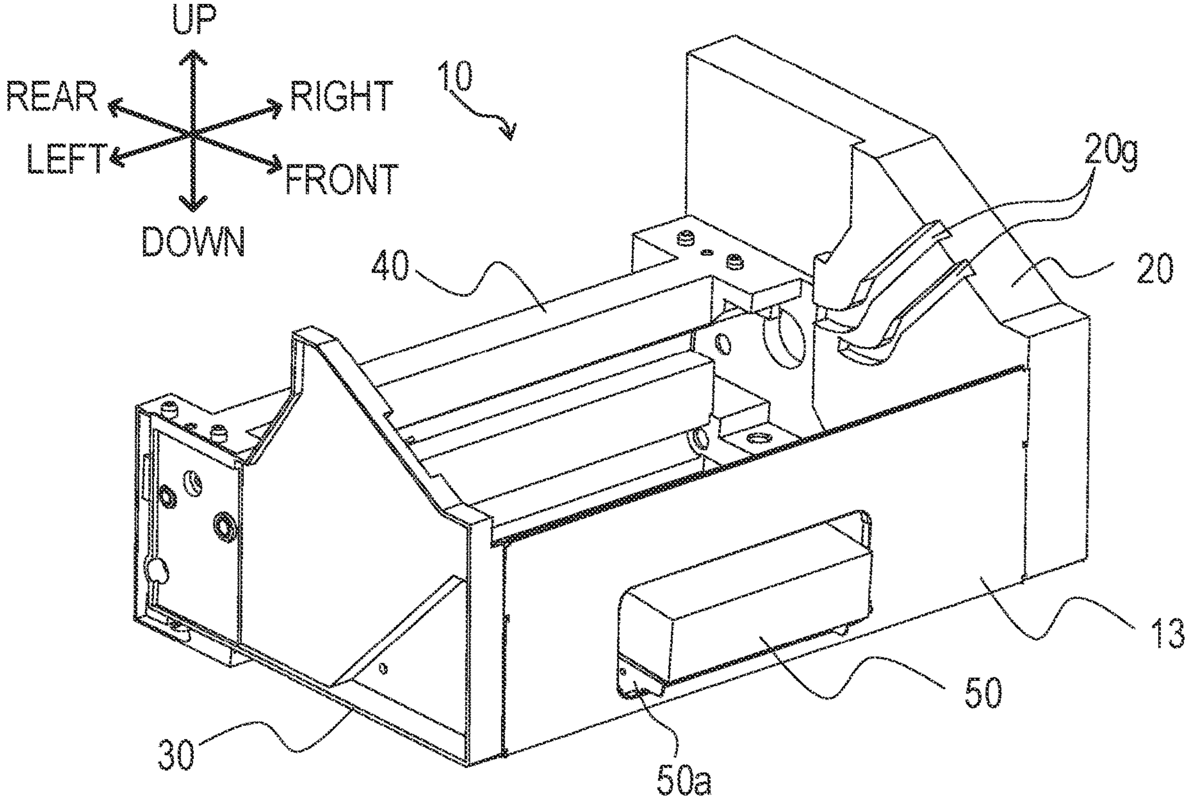
FIG. 17A, FIG. 17B, and FIG. 17C are perspective views for illustrating a configuration of the image forming module in Modification Example of the second embodiment.
Figure 17B:
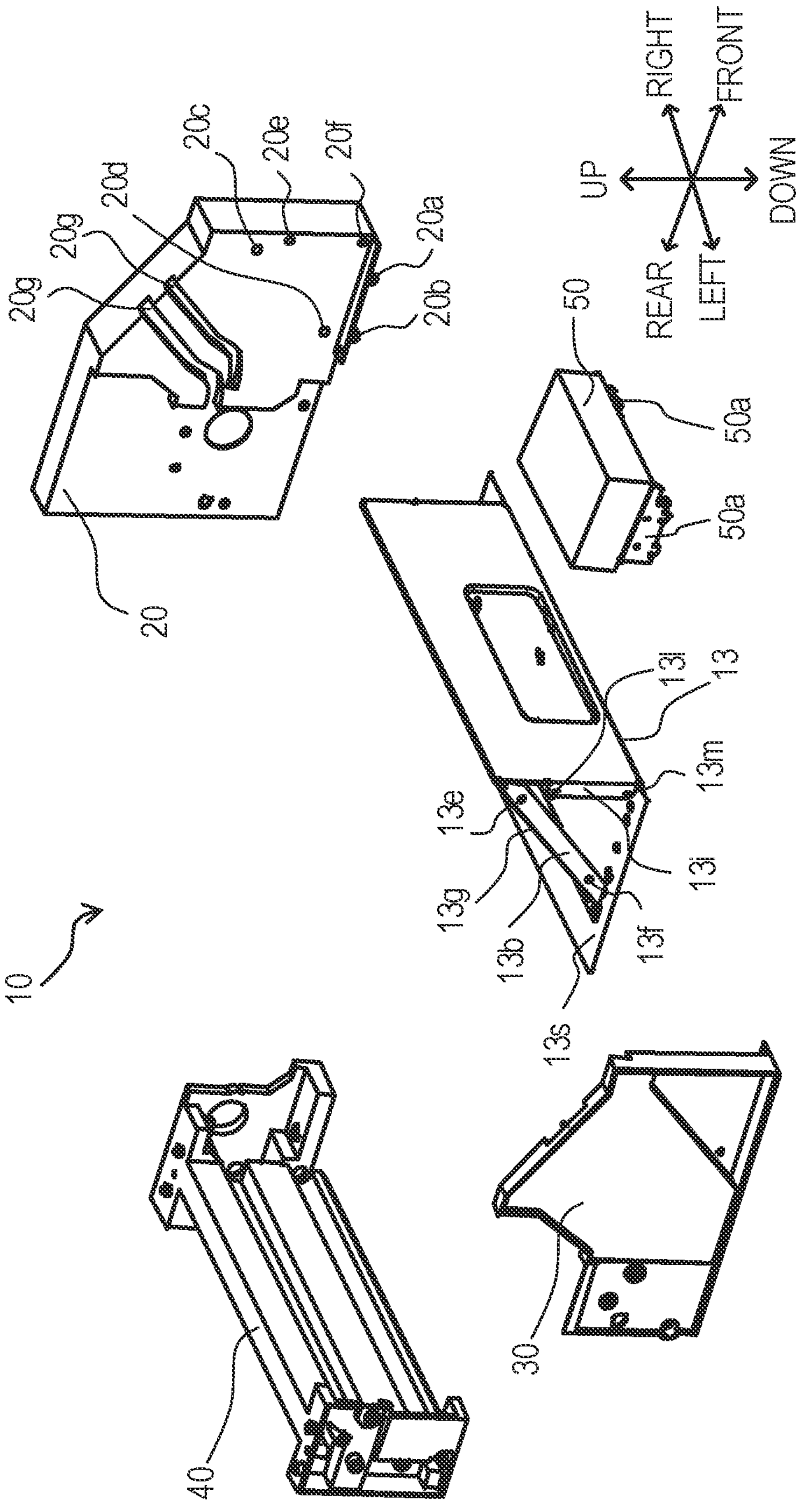
Figure 17C:
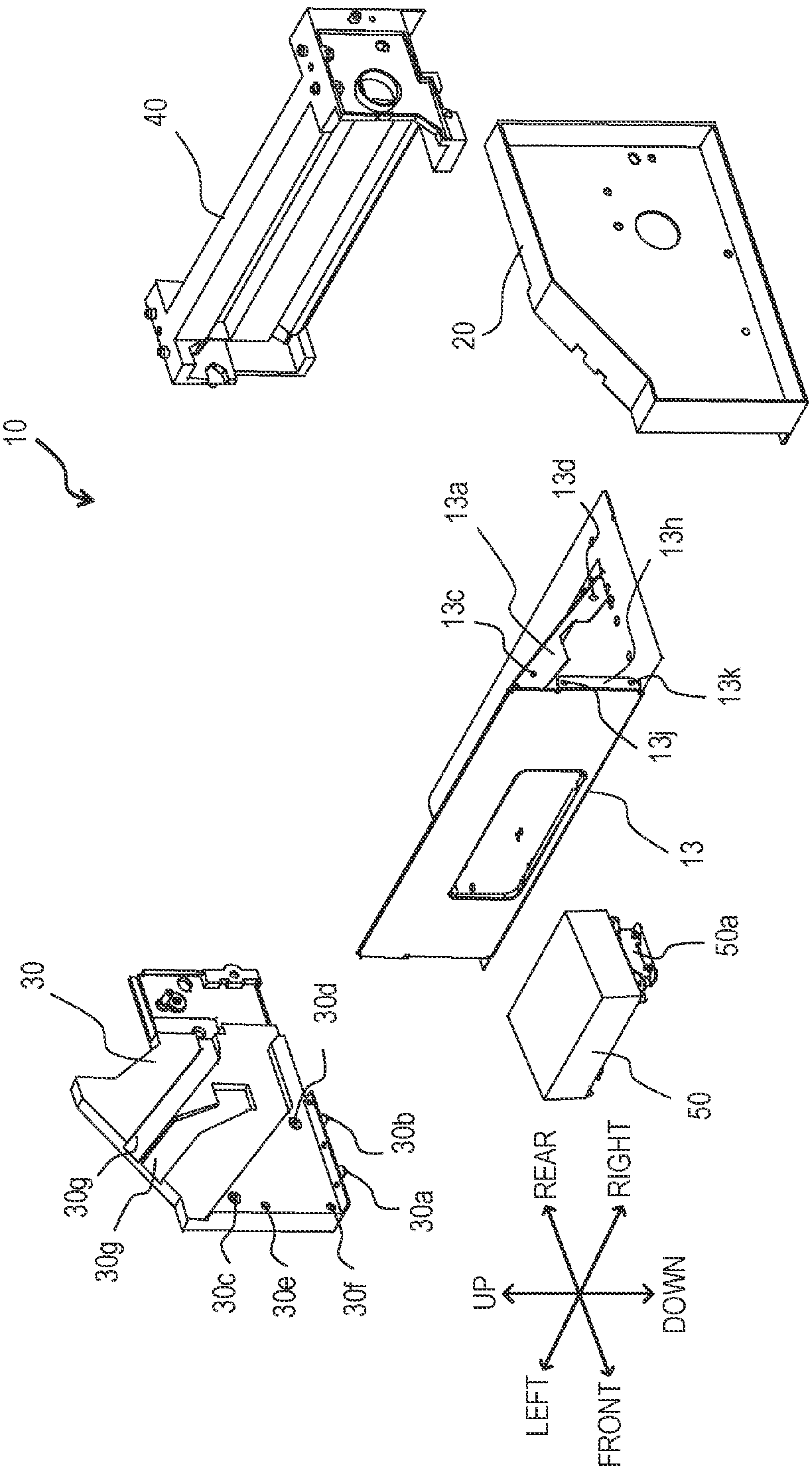

As illustrated in FIG. 17A, FIG. 17B, and FIG. 17C, in order to increase the number of portions of the scanner frame 13 to be fastened to the right side plate 20 and the left side plate 30, there may also be adopted a configuration in Modification Example in which bent portions extending in the vertical direction are additionally formed in the scanner frame 13. In Modification Example of the second embodiment, the scanner frame 13 includes a right side face portion 13*h* and a left side face portion 13*i* that are connected to the first face 13*s* and protrude rearward from right and left end portions of the scanner frame 13, respectively. The right side face portion 13*h* has fitting holes 13*j* and 13*k* through which the right side face portion 13*h* is fastened to the right side plate 20, and the left side face portion 13*i* has fitting holes 13*l* and 13*m* through which the left side face portion 13*i* is fastened to the left side plate 30. Not only screws (not shown) are fitted into the fitting holes 13*c* and 13*d* formed in the right side face portion 13*a* through the fitting holes 20*c* and 20*d* of the right side plate 20, but also screws (not shown) are fitted into fitting holes 20*e* and 20*f* formed in the right side plate 20 through the fitting holes 13*j* and 13*k* of the right side face portion 13*h*. With this configuration, the scanner frame 13 and the right side plate 20 can be more rigidly fixed (screw-fastened) to each other. Similarly, screws (not shown) are fitted into the fitting holes 13*e* and 13*f* formed in the left side face portion 13*b* through the fitting holes 30*c* and 30*d* of the left side plate 30, and screws (not shown) are fitted into fitting holes 30*e* and 30*f* formed in the left side plate 30 through the fitting holes 13*l* and 13*m* of the left side face portion 13*i*. With this configuration, the scanner frame 13 and the left side plate 30 can be more rigidly fixed (screw-fastened) to each other. Thus, in the configuration in Modification Example of the second embodiment, the same effects as those of the second embodiment can be obtained. Further, with the configuration in which the scanner frame 13 includes the right side face portion 13*h* and the left side face portion 13*i* protruding rearward so as to be connected to the first face 13*s* of the scanner frame 13, not only deformation of the first face 13*s* but also deformation of the scanner frame 13 can be suppressed. Moreover, with the configuration in which the scanner frame 13 and the right side plate 20 are fixed to each other through use of the right side face portion 13*h*, and the scanner frame 13 and the left side plate 30 are fixed to each other through use of the left side face portion 13*i*, misalignment of the right side plate 20 and the left side plate 30 with respect to the scanner frame 13 can be suppressed.

Third Embodiment

In the first embodiment, the bosses 20*a* and 20*b* formed on the bottom surface of the right side plate 20 are respectively inserted into the boss holes 11*a* and 11*b* formed in the first face 11*s* of the scanner frame 11, and thus the right side plate 20 is positioned with respect to the scanner frame 11. Further, the left side plate 30 is positioned with respect to the scanner frame 11 similarly. However, the present disclosure is not limited thereto. There may also be adopted a configuration in which the bosses 20*a* and 20*b* are not formed on the bottom surface of the right side plate 20 unlike the first embodiment, and boss holes, into which the bosses 20*a* and

20*b* are to be inserted, are not formed in a first face 11*s* of a scanner frame 11. Similarly, there may also be adopted a configuration in which the bosses 30*a* and 30*b* are not formed on the bottom surface of the left side plate 30 unlike the first embodiment, and boss holes, into which the bosses 30*a* and 30*b* are to be inserted, are not formed in the first face 11*s* of the scanner frame 11. In a third embodiment, description is made of a configuration in which positioning is performed in such a manner that protruding portions formed on the scanner frame are inserted into holes formed in the right side plate and the left side plate.

[Configuration of Image Forming Module]

Figure 18A:
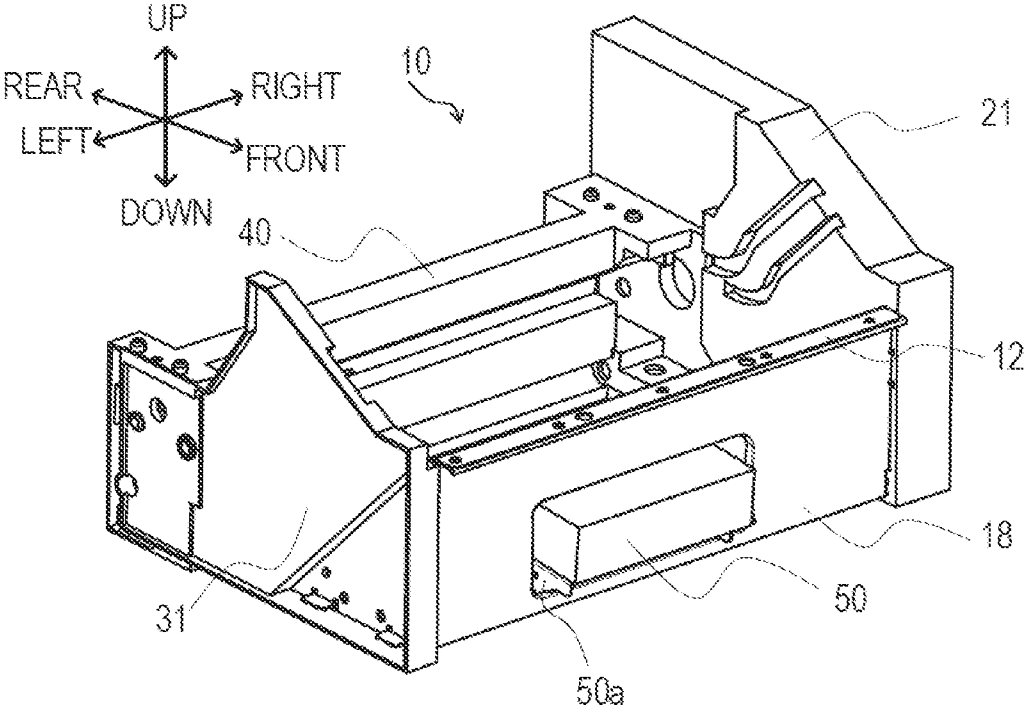
FIG. 18A, FIG. 18B, and FIG. 18C are views for illustrating a configuration of the image forming module in a third embodiment.
Figure 18B:
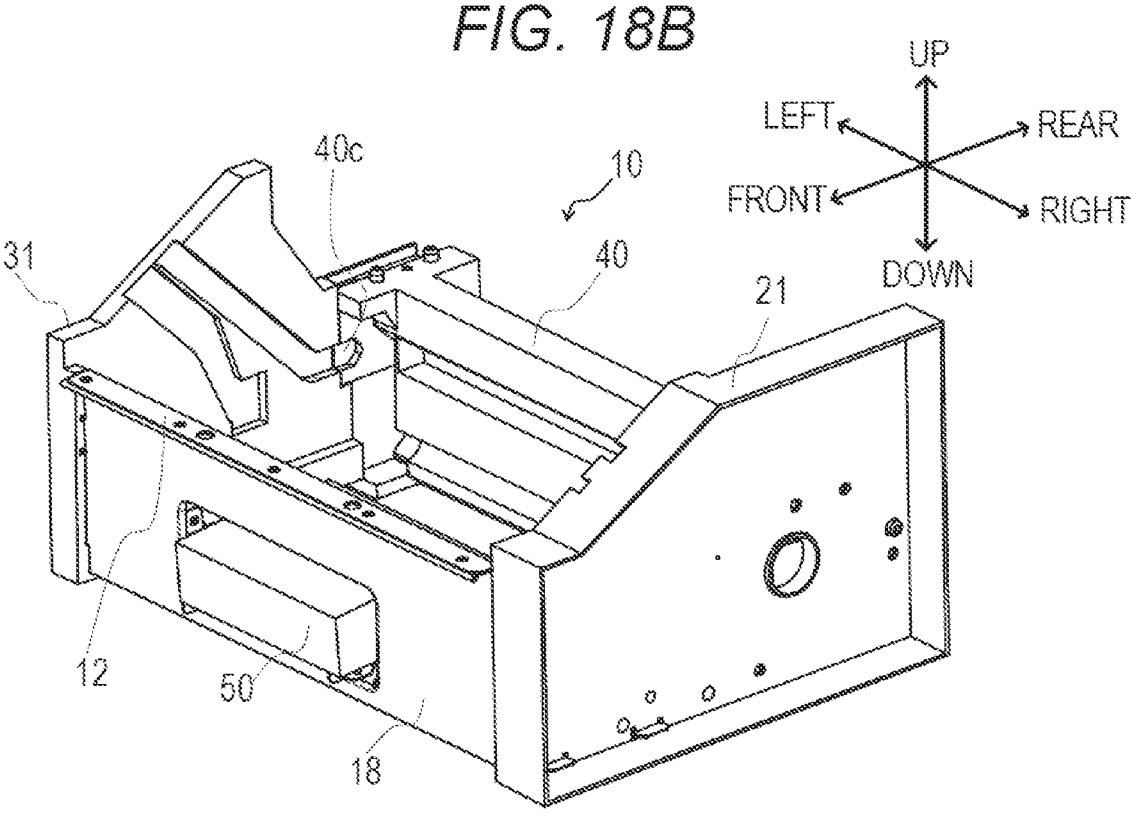
Figure 18C:
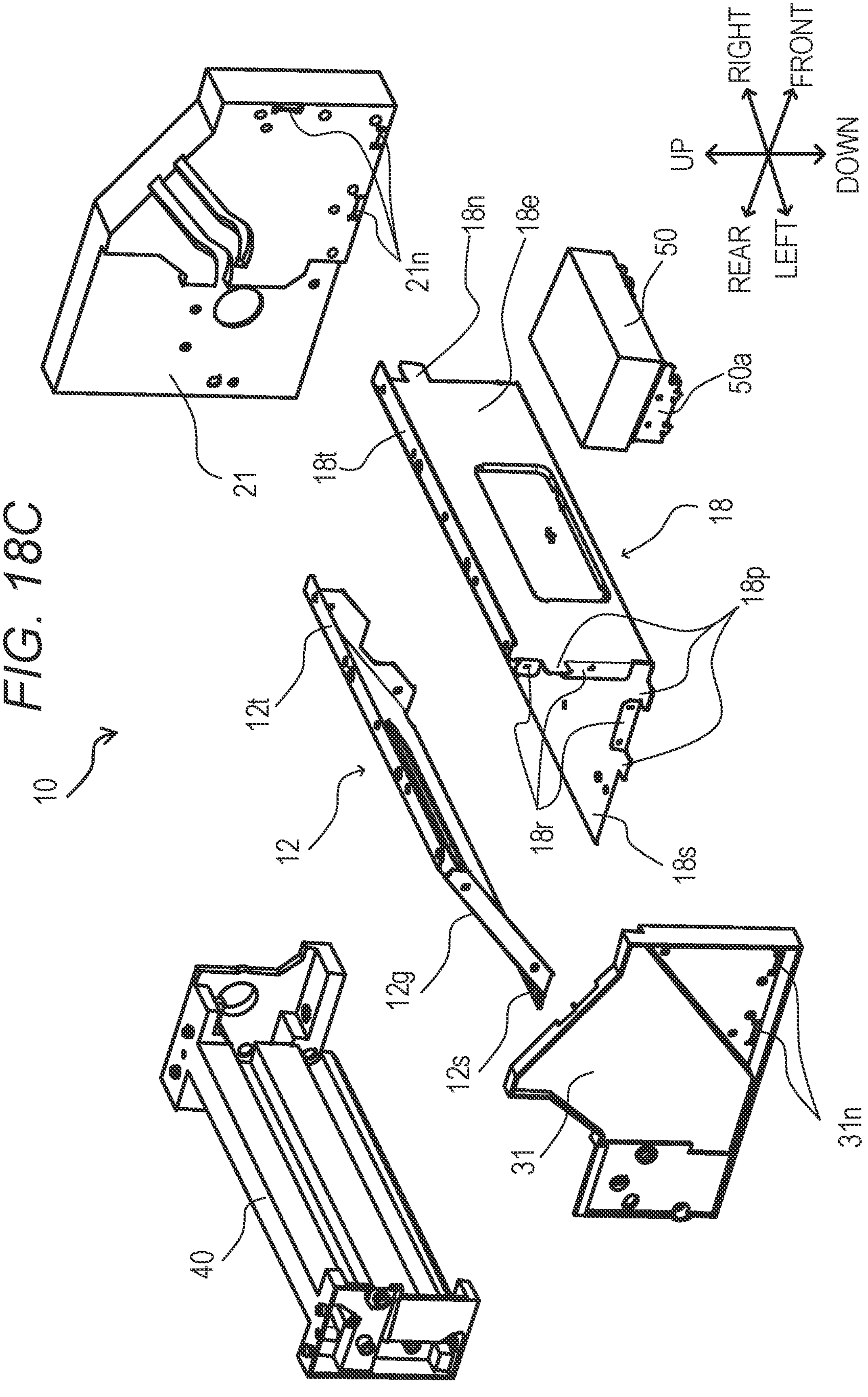
Figure 19A:
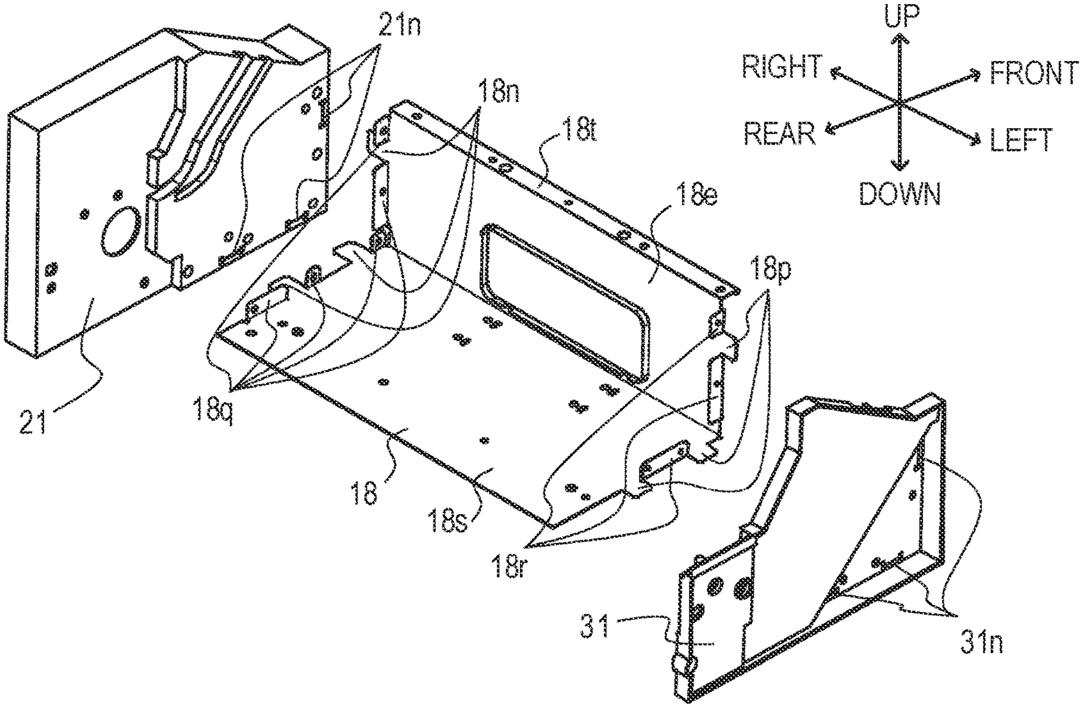
FIG. 19A, FIG. 19B, and FIG. 19C are views for illustrating an assembly configuration of components of the image forming module in the third embodiment.
Figure 19B:
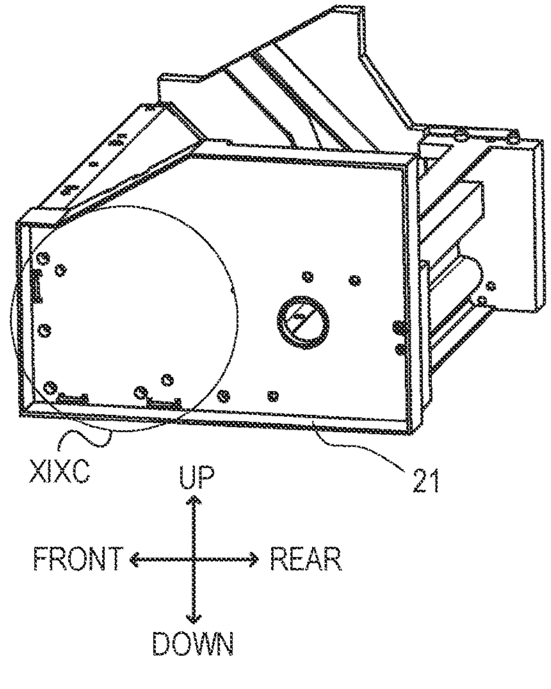
Figure 19C:
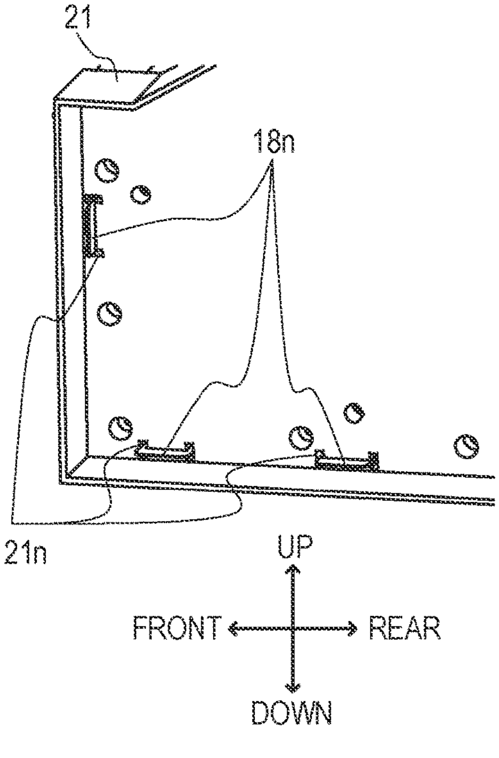

The third embodiment is described with reference to FIG. 18A, FIG. 18B, FIG. 18C, FIG. 19A, FIG. 19B, and FIG. 19C. FIG. 18A is a perspective view for illustrating the image forming module 10 in the third embodiment as seen from the upper left side thereof. FIG. 18B is a perspective view for illustrating the image forming module 10 in the third embodiment as seen from the upper right side thereof. FIG. 18C is an exploded perspective view for illustrating components of the image forming module 10 as seen from the upper left side of the image forming module 10. FIG. 19A is a perspective view for illustrating shapes of a right side plate 21, a left side plate 31, and the scanner frame 18 of FIG. 18A. FIG. 19B is a perspective view for illustrating a state in which the right side plate 21 and the scanner frame 18 are assembled to each other when the image forming module 10 in the third embodiment is seen from a right side surface of the image forming module 10. FIG. 19C is an enlarged perspective view for illustrating a portion XIXC enclosed in the circle of FIG. 19B. The image forming module 10 in the third embodiment is the same as that in the first embodiment except for the right side plate 21, the left side plate 31, and the scanner frame 18. In the third embodiment, the same components as those in the first embodiment are denoted by the same reference symbols, and hence description thereof is omitted.

Similarly to the first embodiment, the scanner frame 18 includes the first face 18*s*, a second face 18*e*, and a support portion 18*t*. On the first face 18*s*, the plurality of components of the image forming module 10 are to be installed. The second face 18*e* has one end connected to the first face 18*s*, and extends in an angular manner from (intersects) the first face 18*s*. The support portion 18*t* is connected to another end of the second face 18*e*. In the third embodiment, the first face 18*s* is a surface extending in the horizontal direction, and the second face 18*e* is a surface extending in the vertical direction perpendicular to the first face 18*s*. Further, the support portion 18*t* is a surface extending in an angular manner from the second face 18*e* in the direction of separating from the scanner reinforcement plate 12. One end of the scanner reinforcement plate 12 is connected to the first face 18*s* of the scanner frame 18, and another end of the scanner reinforcement plate 12 is connected to the second face 18*e* (or the support portion 18*t*) of the scanner frame 18. Thus, the scanner frame 18 and the scanner reinforcement plate 12 form a structural body having a triangular cross section. In the scanner frame 18 and the scanner reinforcement plate 12, the support portion 18*t* and the first fixing portion 12*t* are fixed to each other with screws (not shown), and the first face 18*s* and the second fixing portion 12*s* are fixed to each other with screws (not shown).

The scanner frame 18 in the third embodiment includes three protruding portions 18*n* (first protruding portions) and three protruding portions 18*p* (second protruding portions) protruding from the first face 18*s* and the second face 18*e*. The protruding portions 18*n* protrude rightward from a right end portion of the scanner frame 18, and the protruding portions 18*p* protrude leftward from a left end portion of the scanner frame 18. More specifically, at the right end portion of the scanner frame 18, two of the protruding portions 18*n* are connected to the first face 18*s* and extend in an extending direction of the first face 18*s*, and the remaining one of the protruding portions 18*n* is connected to the second face 18*e* and extends in an extending direction of the second face 18*e*. Meanwhile, at the left end portion of the scanner frame 18, two of the protruding portions 18*p* are connected to the first face 18*s* and extend in the extending direction of the first face 18*s*, and the remaining one of the protruding portions 18*p* is connected to the second face 18*e* and extends in the extending direction of the second face 18*e*.

Further, the scanner frame 18 includes five fastening surfaces 18*q* (third fastening surfaces) and three fastening surfaces 18*r* (fourth fastening surfaces) extending from the first face 18*s* and the second face 18*e*. Each of the fastening surfaces 18*q* is formed by bending a part of the right end portion of the scanner frame 18 and has a screw hole. Each of the fastening surfaces 18*r* is formed by bending a part of the left end portion of the scanner frame 18 and has at least one screw hole. More specifically, at the right end portion of the scanner frame 18, three of the fastening surfaces 18*q* are connected to the first face 18*s* and extend in an angular manner from the first face 18*s*, and the remaining two of the fastening surfaces 18*q* are connected to the second face 18*e* and extend the extending direction of the second face 18*e*. Meanwhile, at the left end portion of the scanner frame 18, one of the fastening surfaces 18*r* is connected to the first face 18*s* and extends in an angular manner from the first face 18*s*, and the remaining two of the fastening surfaces 18*r* are connected to the second face 18*e* and extend in an angular manner from the second face 18*e*.

The right side plate 21 has three holes 21*n* serving as positioning portions. The three protruding portions 18*n* protruding rightward from the right end portion of the scanner frame 18 are respectively inserted into the holes 21*n*, thereby positioning the right side plate 21 with respect to the scanner frame 18. Under this state, the fastening surfaces 18*q* formed on the scanner frame 18 are superposed on the right side plate 21, and screws are fitted into screw holes of the fastening surfaces 18*q* through fitting holes (not shown) of the right side plate 21. In this manner, the right side plate 21 is fixed (screw-fastened) to the scanner frame 18. Similarly, the left side plate 31 also has three holes 31*n* serving as positioning portions. The three protruding portions 18*p* protruding leftward from the left end portion of the scanner frame 18 are respectively inserted into the holes 31*n*, thereby positioning the left side plate 31 with respect to the scanner frame 18. Under this state, the fastening surfaces 18*r* formed on the scanner frame 18 are superposed on the left side plate 31, and screws are fitted into screw holes of the fastening surfaces 18*r* through fitting holes (not shown) of the left side plate 31. In this manner, the left side plate 31 is fixed (screw-fastened) to the scanner frame 18.

The configuration in the third embodiment is the same as that in the first embodiment except for the protruding portions 18*n* and 18*p* and the fastening surfaces 18*q* and 18*r* of the scanner frame 18 that are to be used for fixing the right side plate 21 and the left side plate 31 to the scanner frame 18. Here, description of the configuration in the third embodiment is omitted. For example, similarly to the first embodiment, in the configuration in the third embodiment, the transfer frame 40 is fixed to the first face 18*s*, and the right side plate 21 and the left side plate 31 are fixed (screw-fastened) to the transfer frame 40. Further, the exposure unit 50 is fixed to the scanner frame 18 through intermediation of the two scanner stays 50*a*. In the first and second embodiments described above, fastening is performed with a screw, but is not limited to fixing with a screw. For example, the fastening may be fixing with a rivet in place of a screw, or fixing by spot welding.

As described above, the image forming module 10 has the configuration in which the scanner reinforcement plate 12, the exposure unit 50, the right side plate 21, the left side plate 31, and the transfer frame 40 are fixed to the scanner frame 18, and the feeding module 60 and the fixing module 70 are fixed to the transfer frame 40. Therefore, the components of the image forming module 10 can be positioned with the scanner frame 18 being used as a reference. With this configuration, misalignment of the components can be minimized, and the components can be assembled together with the image forming module 10 including the scanner frame 18 and the exposure unit 50 being used as a reference. Particularly in the third embodiment, the protruding portions 18*n* formed on the scanner frame 18 are respectively inserted into the holes 21*n* formed in the right side plate 21, and the protruding portions 18*p* are respectively inserted into the holes 31*n* formed in the left side plate 31, thereby positioning the components of the image forming module 10. Thus, misalignment of the right side plate 21 and the left side plate 31 with respect to the scanner frame 18 can be minimized, and the right side plate 21 and the left side plate 31 can be fixed stably. As a result, misalignment of the laser beam irradiation position on the photosensitive drum 101 irradiated with the laser beam emitted from the exposure unit 50 can be minimized, thereby being capable of realizing the image forming apparatus having high printing accuracy.

Moreover, the scanner reinforcement plate 12 is combined with the scanner frame 18 that retains the exposure unit 50. Accordingly, the scanner frame 18 has a sturdy configuration so as to be less liable to deform due to an external force. When the right side plate 21, the left side plate 31, and the transfer frame 40 are fixed to the scanner frame 18 attaining the sturdy configuration owing to combination with the scanner reinforcement plate 12, only a portion that causes a defect in image formation due to deformation can be reinforced. Thus, misalignment of the laser beam irradiation position irradiated with the laser beam emitted from the exposure unit 50, which is caused by distortion or strain of the frame, can be minimized at low cost, thereby being capable of realizing the image forming apparatus having high printing accuracy.

Further, the feeding module 60 and the fixing module 70 are positioned and fixed to the transfer frame 40, and the photosensitive drum 101 and the cartridge 102 are positioned by the positioning portions 40*c* of the transfer frame 40. With this configuration, misalignment of the rollers on the upstream side and the downstream side of the photosensitive drum 101 in the direction of conveying the sheet S is minimized, and hence stable sheet conveyance can be achieved, thereby being capable of realizing the image forming apparatus having high printing accuracy.

As described above, according to the third embodiment, occurrence of the misalignment in the image forming module can be prevented, and rigidity can be secured.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
- a feeding module configured to feed a recording material;
- an image forming module having a photosensitive drum and configured to form a developer image on the recording material fed to the image forming module by the feeding module; and
- a fixing module configured to fix the developer image formed by the image forming module to the recording material,
- wherein the image forming module includes a scanner frame configured to support an exposure unit configured to expose the photosensitive drum and the feeding module is installed on the scanner frame,
- wherein the scanner frame includes a first face and a second face where the second face has one end connected to one end of the first face and extends in a direction intersecting the first face, and
- wherein the exposure unit is arranged such that a part of the exposure unit protrudes from a through hole formed in the second face.

2. The image forming apparatus according to claim 1, wherein the image forming module further includes:
- a cartridge including the photosensitive drum,
- a first side plate having a first insertion/removal guide configured to guide the cartridge, where the first side plate is fixed to one end of the scanner frame and is configured to support one end portion of the cartridge in an axial direction of the photosensitive drum, and
- a second side plate having a second insertion/removal guide configured to guide the cartridge, where the second side plate is fixed to another end of the scanner frame and is configured to support another end portion of the cartridge in the axial direction.

3. The image forming apparatus according to claim 2, wherein the first side plate and the second side plate each include a boss, and are each positioned in such a manner that each boss is inserted into a hole formed in the first face of the scanner frame.

4. The image forming apparatus according to claim 2, wherein the image forming module further includes a transfer member which is opposed to the photosensitive drum to form a nip portion, and includes a transfer frame configured to support the transfer member, wherein the transfer member is configured to transfer developer from the photosensitive drum to the recording material in a state in which the cartridge is mounted to the image forming module, and wherein, to be positioned, the cartridge, which is inserted along and guided by the first insertion/removal guide of the first side plate and the second insertion/removal guide of the second side plate, is brought into abutment against the transfer frame.

5. The image forming apparatus according to claim 4, wherein the exposure unit, the first side plate, the second side plate, and the transfer frame are fixed to the first face of the scanner frame.

6. The image forming apparatus according to claim 2, further comprising a scanner reinforcement plate connected to another end of the first face of the scanner frame and another end of the second face of the scanner frame.

7. The image forming apparatus according to claim 6, wherein, in addition to the first face and the second face, the scanner frame further includes a support portion connected to the other end of the second face, wherein the scanner reinforcement plate includes a first fixing portion, an inclined face portion, and a second fixing portion, wherein the first fixing portion is to be fixed to the support portion, the inclined face portion includes one end connected to the first fixing portion, and the inclined face portion includes another end connected to the second fixing portion, and wherein the scanner reinforcement plate is fixed to the scanner frame by the first fixing portion of the scanner reinforcement plate being fixed to the support portion of the scanner frame and the second fixing portion of the scanner reinforcement plate being fastened to the first face of the scanner frame.

8. The image forming apparatus according to claim 6, wherein one end of the scanner reinforcement plate in the axial direction is fixed to the first side plate, and another end of the scanner reinforcement plate in the axial direction is fixed to the second side plate.

9. The image forming apparatus according to claim 6, wherein the scanner reinforcement plate has an opening through which light emitted from the exposure unit irradiates the photosensitive drum, and the exposure unit is supported in the opening of the scanner reinforcement plate.

10. The image forming apparatus according to claim 2, wherein the scanner frame further includes a first protruding portion and a second protruding portion, wherein the first protruding portion protrudes from the one end of the scanner frame toward one side in the axial direction, and the second protruding portion protrudes from the other end of the scanner frame toward another side in the axial direction, and wherein the first protruding portion is inserted into a hole provided in the first side plate so that the first side plate is positioned with respect to the scanner frame, and the second protruding portion is inserted into a hole formed in the second side plate so that the second side plate is positioned with respect to the scanner frame.

11. The image forming apparatus according to claim 2, wherein the exposure unit includes a boss configured to determine a position of a housing of the exposure unit, and the boss is inserted into a hole provided in the scanner frame so as to be positioned.

12. The image forming apparatus according to claim 11, wherein the image forming module further includes a transfer member which is opposed to the photosensitive drum to form a nip portion, and includes a transfer frame configured to support the transfer member, wherein the transfer member is configured to transfer developer from the photosensitive drum to the recording material in a state in which the cartridge is mounted to the image forming module, and wherein the transfer frame is fixed to the scanner frame, the first side plate, and the second side plate.

13. The image forming apparatus according to claim 12, wherein the boss is a first boss, and the feeding module includes a second boss on a surface opposed to the transfer frame, and wherein the feeding module is positioned with respect to the transfer frame by the second boss being inserted into a hole provided in the transfer frame.

14. The image forming apparatus according to claim 13, wherein the transfer frame includes a third boss on a surface opposed to the fixing module, and the fixing module is positioned with respect to the transfer frame by the third boss being inserted into a hole provided in the fixing module.

* * * * *